(12) United States Patent
Sapugay et al.

(10) Patent No.: US 10,713,441 B2
(45) Date of Patent: *Jul. 14, 2020

(54) HYBRID LEARNING SYSTEM FOR NATURAL LANGUAGE INTENT EXTRACTION FROM A DIALOG UTTERANCE

(71) Applicant: ServiceNow, Inc., Santa Clara, CA (US)

(72) Inventors: Edwin Sapugay, Foster City, CA (US); Anil Kumar Madamala, Sunnyvale, CA (US); Maxim Naboka, Santa Clara, CA (US); Srinivas SatyaSai Sunkara, Sunnyvale, CA (US); Lewis Savio Landry Santos, Santa Clara, CA (US); Murali B. Subbarao, Saratoga, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/238,324

(22) Filed: Jan. 2, 2019

(65) Prior Publication Data

US 2019/0295535 A1 Sep. 26, 2019

Related U.S. Application Data

(60) Provisional application No. 62/659,710, filed on Apr. 19, 2018, provisional application No. 62/657,751, (Continued)

(51) Int. Cl.
*G06F 40/30* (2020.01)
*G06N 20/00* (2019.01)
(Continued)

(52) U.S. Cl.
CPC ............ *G06F 40/30* (2020.01); *G06F 40/205* (2020.01); *G06F 40/211* (2020.01); *G06N 5/022* (2013.01);
(Continued)

(58) Field of Classification Search
CPC ..... G10L 15/16; G10L 15/18; G10L 15/1822; G10L 15/22; G10L 2015/223;
(Continued)

(56) References Cited

U.S. PATENT DOCUMENTS 6,609,122 B1  8/2003  Ensor
7,020,706 B2  3/2006  Cates
(Continued)

OTHER PUBLICATIONS

Cerisara, Christophe, et al. "On the effects of using word2vec representations in neural networks for dialogue act recognition." Computer Speech & Language, 47, Jan. 2018, pp. 175-193. (Year: 2018).*

(Continued)

*Primary Examiner* — James S Wozniak
(74) *Attorney, Agent, or Firm* — Fletcher Yoder PC

(57) ABSTRACT

An agent automation system includes a memory configured to store a natural language understanding (NLU) framework and a processor configured to execute instructions of the NLU framework to cause the agent automation system to perform actions. These actions comprise: generating an annotated utterance tree of an utterance using a combination of rules-based and machine-learning (ML)-based components, wherein a structure of the annotated utterance tree represents a syntactic structure of the utterance, and wherein nodes of the annotated utterance tree include word vectors that represent semantic meanings of words of the utterance; and using the annotated utterance tree as a basis for intent/entity extraction of the utterance.

19 Claims, 18 Drawing Sheets

Related U.S. Application Data filed on Apr. 14, 2018, provisional application No. 62/652,903, filed on Apr. 5, 2018, provisional application No. 62/646,915, filed on Mar. 23, 2018, provisional application No. 62/646,916, filed on Mar. 23, 2018, provisional application No. 62/646,917, filed on Mar. 23, 2018.

(51) Int. Cl.

| | | |
|---|---|---|
| *G10L 15/19* | (2013.01) | |
| *G10L 15/22* | (2006.01) | |
| *G06N 5/02* | (2006.01) | |
| *G06F 40/205* | (2020.01) | |
| *G06F 40/211* | (2020.01) | |
| *G10L 15/18* | (2013.01) | |
| *G10L 15/16* | (2006.01) | |

(52) U.S. Cl.
CPC .............. *G06N 20/00* (2019.01); *G10L 15/19* (2013.01); *G10L 15/22* (2013.01); *G10L 15/16* (2013.01); *G10L 15/1807* (2013.01); *G10L 15/1822* (2013.01); *G10L 2015/223* (2013.01); *G10L 2015/225* (2013.01)

(58) Field of Classification Search
CPC .............. G10L 15/1807; G06F 17/271; G06F 17/2705; G06F 17/2785; G06F 40/205; G06F 40/211; G06F 40/30
USPC ..................... 704/9, 232, 257, 275
See application file for complete search history.

(56) References Cited

U.S. PATENT DOCUMENTS

| | | | |
|---|---|---|---|
| 7,028,301 B2 | 4/2006 | Ding | |
| 7,062,683 B2 | 6/2006 | Warpenburg | |
| 7,131,037 B1 | 10/2006 | LeFaive | |
| 7,170,864 B2 | 1/2007 | Matharu | |
| 7,350,209 B2 | 3/2008 | Shum | |
| 7,509,653 B2 | 3/2009 | Das et al. | |
| 7,610,512 B2 | 10/2009 | Gerber | |
| 7,617,073 B2 | 11/2009 | Trinon | |
| 7,617,500 B2 | 11/2009 | Astl et al. | |
| 7,630,784 B2 | 12/2009 | Hunt et al. | |
| 7,653,650 B2 | 1/2010 | Kulkarni et al. | |
| 7,689,628 B2 | 3/2010 | Garg | |
| 7,716,353 B2 | 5/2010 | Golovinsky | |
| 7,769,718 B2 | 8/2010 | Murley | |
| 7,783,744 B2 | 8/2010 | Garg | |
| 7,849,201 B1 | 12/2010 | Subbarao et al. | |
| 7,890,802 B2 | 2/2011 | Gerber | |
| 7,899,670 B1* | 3/2011 | Young ................ G10L 15/30 | |
| | | | 379/75 |
| 7,925,981 B2 | 4/2011 | Pourheidari | |
| 7,930,396 B2 | 4/2011 | Trinon | |
| 8,006,240 B2 | 4/2011 | Bhatkhande et al. | |
| 7,945,860 B2 | 5/2011 | Vambenepe | |
| 7,958,031 B2 | 6/2011 | Hunt et al. | |
| 7,966,398 B2 | 6/2011 | Wiles | |
| 7,971,147 B2 | 6/2011 | Subbarao et al. | |
| 8,051,164 B2 | 11/2011 | Peuter | |
| 8,112,354 B2 | 2/2012 | Lalwani et al. | |
| 8,156,479 B2 | 4/2012 | Fong et al. | |
| 8,224,683 B2 | 7/2012 | Manos | |
| 8,266,096 B2 | 9/2012 | Navarrete | |
| 8,433,654 B2 | 4/2013 | Subbarao et al. | |
| 8,457,928 B2 | 6/2013 | Dang | |
| 8,473,361 B2 | 6/2013 | Subbarao et al. | |
| 8,478,569 B2 | 7/2013 | Scarpelli | |
| 8,612,289 B2 | 12/2013 | Subbarao et al. | |
| 8,650,078 B2 | 2/2014 | Subbarao et al. | |
| 8,674,992 B2 | 3/2014 | Poston | |
| 8,689,241 B2 | 4/2014 | Naik | |
| 8,743,121 B2 | 6/2014 | De Peuter | |
| 8,887,133 B2 | 11/2014 | Behnia | |
| 9,065,783 B2 | 6/2015 | Ding | |
| 9,122,552 B2 | 9/2015 | Whitney | |
| 9,239,857 B2 | 1/2016 | Trinon | |
| 9,535,737 B2 | 1/2017 | Joy | |
| 9,557,969 B2 | 1/2017 | Sharma | |
| 9,626,717 B2 | 4/2017 | Sapugay et al. | |
| 9,633,004 B2 | 4/2017 | Giuli et al. | |
| 9,792,387 B2 | 10/2017 | George | |
| 2003/0009331 A1* | 1/2003 | Schalkwyk ........... G10L 15/187 | |
| | | | 704/237 |
| 2005/0033574 A1* | 2/2005 | Kim ..................... G10L 15/22 | |
| | | | 704/251 |
| 2006/0130038 A1 | 6/2006 | Claussen et al. | |
| 2007/0261065 A1 | 11/2007 | Astl et al. | |
| 2008/0075444 A1 | 3/2008 | Subbarao et al. | |
| 2009/0119102 A1* | 5/2009 | Bangalore .......... G10L 15/1807 | |
| | | | 704/240 |
| 2009/0258333 A1* | 10/2009 | Yu ......................... G09B 5/04 | |
| | | | 434/157 |
| 2011/0238408 A1* | 9/2011 | Larcheveque ...... G06F 17/2785 | |
| | | | 704/9 |
| 2011/0238410 A1* | 9/2011 | Larcheveque ...... G06F 17/2785 | |
| | | | 704/9 |
| 2012/0158791 A1* | 6/2012 | Kasneci .............. G06F 16/9024 | |
| | | | 707/798 |
| 2012/0246073 A1 | 9/2012 | Gore et al. | |
| 2012/0290938 A1 | 11/2012 | Subbarao et al. | |
| 2013/0055223 A1* | 2/2013 | Xu ......................... G06F 8/427 | |
| | | | 717/143 |
| 2014/0067379 A1* | 3/2014 | Kim ..................... G06F 17/271 | |
| | | | 704/9 |
| 2014/0163975 A1* | 6/2014 | Lee ........................ G10L 15/01 | |
| | | | 704/231 |
| 2014/0279274 A1 | 9/2014 | Subbarao et al. | |
| 2014/0297457 A1 | 10/2014 | Sapugay et al. | |
| 2014/0297458 A1 | 10/2014 | Sapugay et al. | |
| 2014/0303957 A1* | 10/2014 | Lee ....................... G06F 17/289 | |
| | | | 704/2 |
| 2014/0365207 A1* | 12/2014 | Convertino ......... G06F 17/2785 | |
| | | | 704/9 |
| 2015/0154173 A1* | 6/2015 | Kim ..................... G06F 17/274 | |
| | | | 704/9 |
| 2015/0269573 A1 | 9/2015 | Subbarao et al. | |
| 2016/0328388 A1* | 11/2016 | Cao ..................... G06F 16/3347 | |
| 2017/0053646 A1* | 2/2017 | Watanabe ............ G10L 15/1822 | |
| 2018/0075844 A1* | 3/2018 | Kim ..................... G10L 15/144 | |
| 2018/0174579 A1* | 6/2018 | Henry .................. G10L 15/197 | |
| 2018/0329998 A1* | 11/2018 | Thomson ............. G06F 16/9535 | |
| 2018/0330721 A1* | 11/2018 | Thomson ............. G10L 15/1815 | |
| 2019/0073434 A1* | 3/2019 | Sathish ................ G06F 3/04883 | |

OTHER PUBLICATIONS

Di Eugenio, Barbara, et al. "Dialogue act classification, higher order dialogue structure, and instance-based learning." Dialogue & Discourse 1.2, Jun. 2010, pp. 1-24. (Year: 2010).*

Guo, Daniel, et al. "Joint semantic utterance classification and slot filling with recursive neural networks." 2014 IEEE Spoken Language Technology Workshop (SLT). IEEE, Dec. 2014, pp. 554-559. (Year: 2014).*

Korpusik, Mandy, et al. "Spoken language understanding for a nutrition dialogue system." IEEE/ACM Transactions on Audio, Speech, and Language Processing, 25.7, Jul. 2017, pp. 1450-1461. (Year: 2017).*

Liu, Bing, et al. "Attention-based recurrent neural network models for joint intent detection and slot filling." arXiv preprint arXiv: 1609.01454, Sep. 2016, pp. 1-5. (Year: 2016).*

Stolcke, Andreas, et al. "Dialogue act modeling for automatic tagging and recognition of conversational speech." Computational linguistics 26.3, Sep. 2000, pp. 339-373. (Year: 2000).*

Yang, Lin-Er, et al. "Neural Parse Combination." Journal of Computer Science and Technology 32.4, Jul. 2017, pp. 749-757. (Year: 2017).*

(56) References Cited

OTHER PUBLICATIONS

Zheng, Yang, et al. "Intent detection and semantic parsing for navigation dialogue language processing." 2017 IEEE 20th International Conference on Intelligent Transportation Systems (ITSC). IEEE, Oct. 2017, pp. 1-6. (Year: 2017).*

Chen, Yun-Nung, et al. "Syntax or semantics? knowledge-guided joint semantic frame parsing." 2016 IEEE Spoken Language Technology Workshop (SLT). IEEE, Dec. 2016, pp. 348-355. (Year: 2016).*

Reuer, Veit. "Error recognition and feedback with lexical functional grammar." Calico journal, Jan. 2003, pp. 497-512. (Year: 2003).*

Shi, Yongmei, et al. "Error detection using linguistic features." Proceedings of the conference on Human Language Technology and Empirical Methods in Natural Language Processing. Association for Computational Linguistics, Oct. 2005, pp. 41-48. (Year: 2005).*

Zhou, Weidong, et al. "Detecting errors in Chinese spoken dialog system using ngram and dependency parsing." Oct. 2008, pp. 532-535. (Year: 2008).*

* cited by examiner

HYBRID LEARNING SYSTEM FOR NATURAL LANGUAGE INTENT EXTRACTION FROM A DIALOG UTTERANCE

CROSS-REFERENCE

This application claims priority from and the benefit of U.S. Provisional Application No. 62/646,915, entitled "HYBRID LEARNING SYSTEM FOR NATURAL LANGUAGE UNDERSTANDING," filed Mar. 23, 2018; U.S. Provisional Application No. 62/646,916, entitled "VOCABULARY MANAGEMENT IN A NATURAL LEARNING FRAMEWORK," filed Mar. 23, 2018; U.S. Provisional Application No. 62/646,917, entitled "METHOD AND SYSTEM FOR AUTOMATED INTENT MINING, CLASSIFICATION AND DISPOSITION," filed Mar. 23, 2018; U.S. Provisional Application No. 62/657,751, entitled "METHOD AND SYSTEM FOR FOCUSED CONVERSATION CONTEXT MANAGEMENT IN A BEHAVIOR ENGINE," filed Apr. 14, 2018; U.S. Provisional Application No. 62/652,903, entitled "TEMPLATED RULE-BASED DATA AUGMENTATION FOR INTENT EXTRACTION FROM SPARSE DATA," filed Apr. 5, 2018; and U.S. Provisional Application No. 62/659,710, entitled "WRITTEN-MODALITY PROSODY SUBSYSTEM IN A NLU FRAMEWORK," filed Apr. 19, 2018, which are incorporated by reference herein in their entirety for all purposes.

BACKGROUND

The present disclosure relates generally to the fields of natural language understanding (NLU) and artificial intelligence (AI), and more specifically, to a hybrid learning system for NLU.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations and these resources may be used to perform a variety computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able redirect their resources to focus on their enterprise's core functions.

In modern communication networks, examples of cloud computing services a user may utilize include so-called infrastructure as a service (IaaS), software as a service (SaaS), and platform as a service (PaaS) technologies. IaaS is a model in which providers abstract away the complexity of hardware infrastructure and provide rapid, simplified provisioning of virtual servers and storage, giving enterprises access to computing capacity on demand. In such an approach, however, a user may be left to install and maintain platform components and applications. SaaS is a delivery model that provides software as a service rather than an end product. Instead of utilizing a local network or individual software installations, software is typically licensed on a subscription basis, hosted on a remote machine, and accessed by client customers as needed. For example, users are generally able to access a variety of enterprise and/or information technology (IT)-related software via a web browser. PaaS acts an extension of SaaS that goes beyond providing software services by offering customizability and expandability features to meet a user's needs. For example, PaaS can provide a cloud-based developmental platform for users to develop, modify, and/or customize applications and/or automating enterprise operations without maintaining network infrastructure and/or allocating computing resources normally associated with these functions.

Such a cloud computing service may host a virtual agent, such as a chat agent, that is designed to automatically respond to issues with the client instance based on natural language requests from a user of the client instance. For example, a user may provide a request to a virtual agent for assistance with a password issue, wherein the virtual agent is part of a Natural Language Processing (NLP) or Natural Language Understanding (NLU) system. NLP is a general area of computer science and AI that involves some form of processing of natural language input. Examples of areas addressed by NLP include language translation, speech generation, parse tree extraction, part-of-speech identification, and others. NLU is a sub-area of NLP that specifically focuses on understanding user utterances. Examples of areas addressed by NLU include question-answering (e.g., reading comprehension questions), article summarization, and others. For example, a NLU may use algorithms to reduce human language (e.g., spoken or written) into a set of known symbols for consumption by a downstream virtual agent. NLP is generally used to interpret free text for further analysis. Current approaches to NLP are typically based on deep learning, which is a type of AI that examines and uses patterns in data to improve the understanding of a program.

As such, it is presently recognized that there is a need to improve the ability of virtual agents to apply NLU techniques to properly derive meaning from complex natural language utterances. For example, it may be advantageous to create a virtual agent capable of comprehending complex language and executing contextually relevant requests, which could afford substantial advantages in terms of reduced operational cost and increased responsiveness to client issues. Additionally, it is recognized that it is advantageous for virtual agents to be customizable and adaptable to various communication channels and styles.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Present embodiments are directed to an agent automation framework that is capable of extracting meaning from user utterances, such as requests received by a virtual agent (e.g., a chat agent), and suitably responding to these user utterances. To do this, the agent automation framework includes a NLU framework and an intent/entity model having defined intents and entities that are associated with sample utterances. The NLU framework includes a meaning extraction subsystem that is designed to generate meaning representations for the sample utterances of the intent/entity model, as well as a meaning representation for a received user utterance. Additionally, the disclosed NLU framework includes a meaning search subsystem that is designed to search the meaning representations of the intent/entity model to locate matches for a meaning representation of a received user utterance. As such, present embodiments generally address the hard problem posed by NLU by transforming it into a manageable search problem.

In present embodiments, a meaning representation can be generated from an annotated utterance tree structure having a form or shape that represents the grammatical structures of the utterance, and having nodes that each represent words or phrases of the utterances as word vectors encoding the semantic meaning of the utterance. The meaning extraction subsystem includes a vocabulary subsystem, a structure subsystem, and a prosody subsystem that cooperate to parse utterances into the annotated utterance trees based on combinations of rule-based methods and machine learning (ML)-based (e.g., statistical) methods. Using one or more tree substructure vectorization algorithms and focus/attention/magnification (FAM) coefficients defined by a stored compilation model template, the meaning extraction subsystem subsequently generates subtree vectors for the annotated utterance tree structure, yielding the corresponding meaning representation for subsequent searching by the meaning search subsystem.

The disclosed NLU framework is also capable of detecting and addressing errors in an annotated utterance tree before the meaning representation is generated. For example, the meaning extraction subsystem can include a rule-based augmentation error detection subsystem that can cooperate with the vocabulary, structure subsystem, and prosody subsystems to iteratively parse and correct an utterance before meaning representations are generated for improved domain specificity. Additionally, present embodiments support entrenchment, whereby the NLU framework can continue to learn or infer meaning of new syntactic structures in new natural language utterance based on previous examples of similar syntactic structures. For example, components of the NLU framework (e.g., the structure subsystem or the vocabulary subsystem of the meaning extraction subsystem) may be continuously updated based on new utterances, such as exchanges between users and a virtual agent, to enhance the adaptability of the NLU framework to changes in the use of certain terms and phrases over time.

The meaning search subsystem of the disclosed NLU framework is designed to compare a meaning representation generated for a received user utterance to the set of meaning representations generated for the sample utterances of the intent/entity model based on the compilation model template. For example, the compilation model template defines one or more tree model comparison algorithms designed to determine a similarity score for two subtree vectors based on class compatibility rules and class-level scoring coefficients stored in the compilation model template. The class compatibility rules define which classes of subtree vectors can be compared to one another (e.g., verb subtree vectors are compared to one another, subject subtree vectors are compared to one another) to determine vector distances between the subtrees of the meaning representations. The class-level scoring coefficients define different relative weights that determine how much the different classes of subtree vectors contribute to an overall vector generated by the substructure vectorization algorithm for a given subtree (e.g., verb subtree vectors and/or direct object subtree vectors may be weighted higher and contribute more than subject subtree vectors or modifier subtree vectors). Using these algorithms, rules, and coefficients of the compilation model template, the meaning search subsystem determines similarity scores between portions of the meaning representation of the user utterance and portions of the meaning representations of the sample utterances of the intent/entity model. Based on these similarity scores, intents/entities defined within the intent/entity model are extracted from the user utterance and passed to a reasoning agent/behavior engine (RA/BE), such as a virtual agent, to take appropriate action based on the extracted intents/entities of the user utterance.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
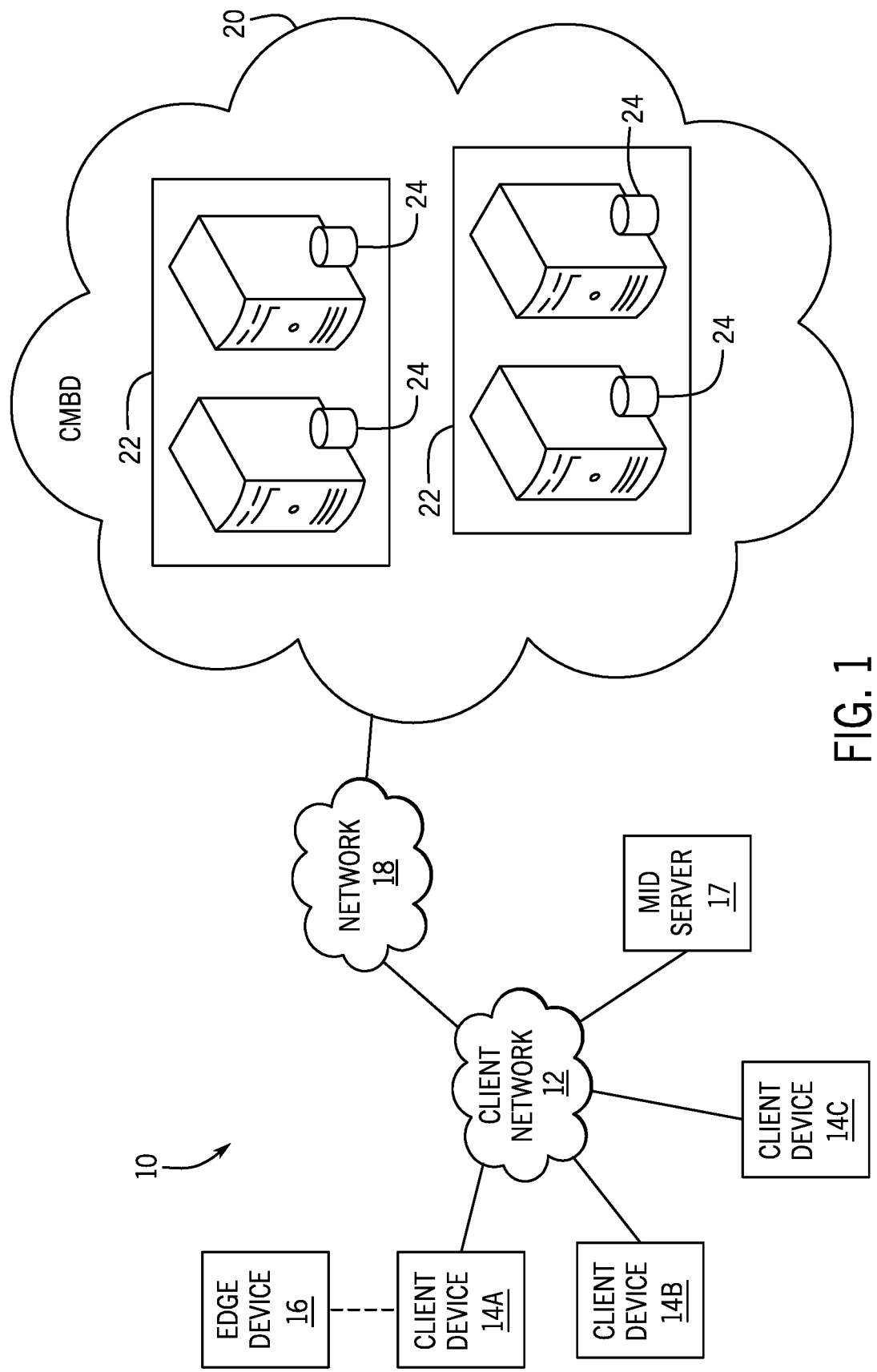
FIG. 1 is a block diagram of an embodiment of a cloud computing system in which embodiments of the present technique may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" or "computing device" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "machine-readable medium" may include a single medium or multiple media (e.g., a centralized or distributed database, and/or associated caches and servers) that store one or more instructions or data structures. The term "non-transitory machine-readable medium" shall also be taken to include any tangible medium that is capable of storing, encoding, or carrying instructions for execution by the computing system and that cause the computing system to perform any one or more of the methodologies of the present subject matter, or that is capable of storing, encoding, or carrying data structures utilized by or associated with such instructions. The term "non-transitory machine-readable medium" shall accordingly be taken to include, but not be limited to, solid-state memories, and optical and magnetic media. Specific examples of non-transitory machine-readable media include, but are not limited to, non-volatile memory, including by way of example, semiconductor memory devices (e.g., Erasable Programmable Read-Only Memory (EPROM), Electrically Erasable Programmable Read-Only Memory (EEPROM), and flash memory devices), magnetic disks such as internal hard disks and removable disks, magneto-optical disks, and CD-ROM and DVD-ROM disks.

As used herein, the terms "application" and "engine" refer to one or more sets of computer software instructions (e.g., computer programs and/or scripts) executable by one or more processors of a computing system to provide particular functionality. Computer software instructions can be written in any suitable programming languages, such as C, C++, C#, Pascal, Fortran, Perl, MATLAB, SAS, SPSS, JavaScript, AJAX, and JAVA. Such computer software instructions can comprise an independent application with data input and data display modules. Alternatively, the disclosed computer software instructions can be classes that are instantiated as distributed objects. The disclosed computer software instructions can also be component software, for example JAVABEANS or ENTERPRISE JAVABEANS. Additionally, the disclosed applications or engines can be implemented in computer software, computer hardware, or a combination thereof.

As used herein, the term "framework" refers to a system of applications and/or engines, as well as any other supporting data structures, libraries, modules, and any other supporting functionality, that cooperate to perform one or more overall functions. In particular, a "natural language understanding framework" or "NLU framework" comprises a collection of computer programs designed to process and derive meaning (e.g., intents, entities) from natural language utterances based on an intent/entity model. As used herein, a "reasoning agent/behavior engine" or "RA/BE" refers to a rule-based agent, such as a virtual agent, designed to interact with users based on a conversation model. For example, a "virtual agent" may refer to a particular example of a RA/BE that is designed to interact with users via natural language requests in a particular conversational or communication channel. With this in mind, the terms "virtual agent" and "RA/BE" are used interchangeably herein. By way of specific example, a virtual agent may be or include a chat agent that interacts with users via natural language requests and responses in a chat room environment. Other examples of virtual agents may include an email agent, a forum agent, a ticketing agent, a telephone call agent, and so forth, which interact with users in the context of email, forum posts, and autoreplies to service tickets, phone calls, and so forth.

As used herein, an "intent" refers to a desire or goal of an agent which may relate to an underlying purpose of a communication, such as an utterance. As used herein, an "entity" refers to an object, subject, or some other parameterization of an intent. It is noted that, for present embodiments, entities are treated as parameters of a corresponding intent. More specifically, certain entities (e.g., time and location) may be globally recognized and extracted for all intents, while other entities are intent-specific (e.g., merchandise entities associated with purchase intents) and are generally extracted only when found within the intents that define them. As used herein, an "intent/entity model" refers to an intent model that associates particular intents with particular sample utterances, wherein certain entity data may be encoded as a parameter of the intent within the model. As used herein, the term "agents" may refer to computer-generated personas (e.g. chat agents or other virtual agents) that interact with one another within a conversational channel. As used herein, a "corpus" refers to a captured body of source data that includes interactions between various users and virtual agents, wherein the interactions include communications or conversations within one or more suitable types of media (e.g., a help line, a chat room or message string, an email string).

As used herein, "source data" may include any suitable captured interactions between various agents, including but not limited to, chat logs, email strings, documents, help documentation, frequently asked questions (FAQs), forum entries, items in support ticketing, recordings of help line calls, and so forth. As used herein, an "utterance" refers to a single natural language statement made by a user or agent that may include one or more intents. As such, an utterance may be part of a previously captured corpus of source data, and an utterance may also be a new statement received from a user as part of an interaction with a virtual agent. As used herein, "machine learning" or "ML" may be used to refer to any suitable statistical form of artificial intelligence capable of being trained using machine learning techniques, including supervised, unsupervised, and semi-supervised learning techniques. For example, in certain embodiments, ML techniques may be implemented using a neural network (NN) (e.g., a deep neural network (DNN), a recurrent neural network (RNN), a recursive neural network). As used herein, a "vector" (e.g., a word vector, an intent vector, a subject vector, a subtree vector) refers to a linear algebra vector that is an ordered n-dimensional list (e.g., a 300 dimensional list) of floating point values (e.g., a 1×N or an N×1 matrix) that provides a mathematical representation of the semantic meaning of a portion (e.g., a word or phrase, an intent, an entity) of an utterance.

As mentioned, a computing platform may include a chat agent, or another similar virtual agent, that is designed to automatically respond to user requests to perform functions or address issues on the platform. There are two predominant technologies in NLU, namely traditional computational linguistics and newer machine learning (ML) methods. It is presently recognized that these two technologies demonstrate different strengths and weaknesses with respect to NLU. For example, traditional computational linguistic methods, also referred to herein as "rule-based" methods, include precision rule-sets and manually-crafted ontologies that enable precise adjudication of linguistic structure and semantic understanding to derive meaning representations. Traditional cognitive linguistic techniques also include the concept of construction grammars, in which an aspect of the meaning of a natural language utterance can be determined based on the form (e.g., syntactic structure) of the utterance. Therefore, rule-based methods offer results that are easily explainable and customizable. However, it is presently recognized that such rule-based methods are not particularly robust to natural language variation or adept at adapting to language evolution. As such, it is recognized that rule-based methods alone are unable to effectively react to (e.g., adjust to, learn from) data-driven trends, such as learning from chat logs and other data repositories. Furthermore, rule-based methods involve the creation of hand-crafted rules that can be cumbersome, wherein these rules usually are domain specific and are not easily transferable to other domains.

On the other hand, ML-based methods, perform well (e.g., better than rule-based methods) when a large corpus of natural language data is available for analysis and training. The ML-based methods have the ability to automatically "learn" from the data presented to recall over "similar" input. Unlike rule-based methods, ML-based methods do not involve cumbersome hand-crafted features-engineering, and ML-based methods can support continued learning (e.g., entrenchment). However, it is recognized that ML-based methods struggle to be effective when the size of the corpus is insufficient. Additionally, ML-based methods are opaque (e.g., not easily explained) and are subject to biases in source data. Furthermore, while an exceedingly large corpus may be beneficial for ML training, source data may be subject to privacy considerations that run counter to the desired data aggregation.

Accordingly, present embodiments are generally directed toward an agent automation framework capable of applying a combination rule-based and ML-based cognitive linguistic techniques to leverage the strengths of both techniques in extracting meaning from natural language utterances. More specifically, present embodiments are directed to generating suitable meaning representations for utterances, including received user utterances and sample utterances of an intent/entity model. These meaning representations generally have a shape that captures the syntactic structure of an utterance, and include one or more subtree vectors that represent the semantic meanings of portions of the utterance. The meaning representation of the utterance can then be searched against a search space populated with the meaning representations of the sample utterances of the intent/entity model, and one or more matches may be identified. In this manner, present embodiments extract intents/entities from the user utterance, such that a virtual agent can suitably respond to these intent/entities. As such, present embodiments generally address the hard NLU problem by transforming it into a more manageable search problem.

With the preceding in mind, the following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized. Turning now to FIG. 1, a schematic diagram of an embodiment of a computing system 10, such as a cloud computing system, where embodiments of the present disclosure may operate, is illustrated. Computing system 10 may include a client network 12, network 18 (e.g., the Internet), and a cloud-based platform 20. In some implementations, the cloud-based platform may host a management database (CMDB) system and/or other suitable systems. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 22, and/or other remote networks. As shown in FIG. 1, the client network 12 is able to connect to one or more client devices 14A, 14B, and 14C so that the client devices are able to communicate with each other and/or with the network hosting the platform 20. The client devices 14A-C may be computing systems and/or other types of computing devices generally referred to as Internet of Things (IoT) devices that access cloud computing services, for example, via a web browser application or via an edge device 16 that may act as a gateway between the client devices and the platform 20. FIG. 1 also illustrates that the client network 12 includes an administration or managerial device or server, such as a management, instrumentation, and discovery (MID) server 17 that facilitates communication of data between the network hosting the platform 20, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 18. The network 18 may include one or more computing networks, such as other LANs, wide area networks (WAN), the Internet, and/or other remote networks, to transfer data between the client devices 14A-C and the network hosting the platform 20. Each of the computing networks within network 18 may contain wired and/or wireless programmable devices that operate in the electrical and/or optical domain. For example, network 18 may include wireless networks, such as cellular networks (e.g., Global System for Mobile Communications (GSM) based cellular network), IEEE 802.11 networks, and/or other suitable radio-based networks. The network 18 may also employ any number of network communication protocols, such as Transmission Control Protocol (TCP) and Internet Protocol (IP). Although not explicitly shown in FIG. 1, network 18 may include a variety of network devices, such as servers, routers, network switches, and/or other network hardware devices configured to transport data over the network 18.

In FIG. 1, the network hosting the platform 20 may be a remote network (e.g., a cloud network) that is able to communicate with the client devices 14A-C via the client network 12 and network 18. The network hosting the platform 20 provides additional computing resources to the client devices 14A-C and/or client network 12. For example, by utilizing the network hosting the platform 20, users of client devices 14A-C are able to build and execute applications for various enterprise, IT, and/or other organization-related functions. In one embodiment, the network hosting the platform 20 is implemented on one or more data centers 22, where each data center could correspond to a different geographic location. Each of the data centers 22 includes a plurality of virtual servers 24 (also referred to herein as application nodes, application servers, virtual server instances, application instances, or application server instances), where each virtual server can be implemented on a physical computing system, such as a single electronic computing device (e.g., a single physical hardware server) or across multiple-computing devices (e.g., multiple physical hardware servers). Examples of virtual servers 24 include, but are not limited to a web server (e.g., a unitary web server installation), an application server (e.g., unitary JAVA Virtual Machine), and/or a database server, e.g., a unitary relational database management system (RDBMS) catalog.

To utilize computing resources within the platform 20, network operators may choose to configure the data centers 22 using a variety of computing infrastructures. In one embodiment, one or more of the data centers 22 are configured using a multi-tenant cloud architecture, such that one of the server instances 24 handles requests from and serves multiple customers. Data centers with multi-tenant cloud architecture commingle and store data from multiple customers, where multiple customer instances are assigned to one of the virtual servers 24. In a multi-tenant cloud architecture, the particular virtual server 24 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 24 causing outages for all customers allocated to the particular server instance.

In another embodiment, one or more of the data centers 22 are configured using a multi-instance cloud architecture to provide every customer its own unique customer instance or instances. For example, a multi-instance cloud architecture could provide each customer instance with its own dedicated application server(s) and dedicated database server(s). In other examples, the multi-instance cloud architecture could deploy a single physical or virtual server and/or other combinations of physical and/or virtual servers 24, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 20, and customer-driven upgrade schedules. An example of implementing a customer instance within a multi-instance cloud architecture will be discussed in more detail below with reference to FIG. 2.

Figure 2:
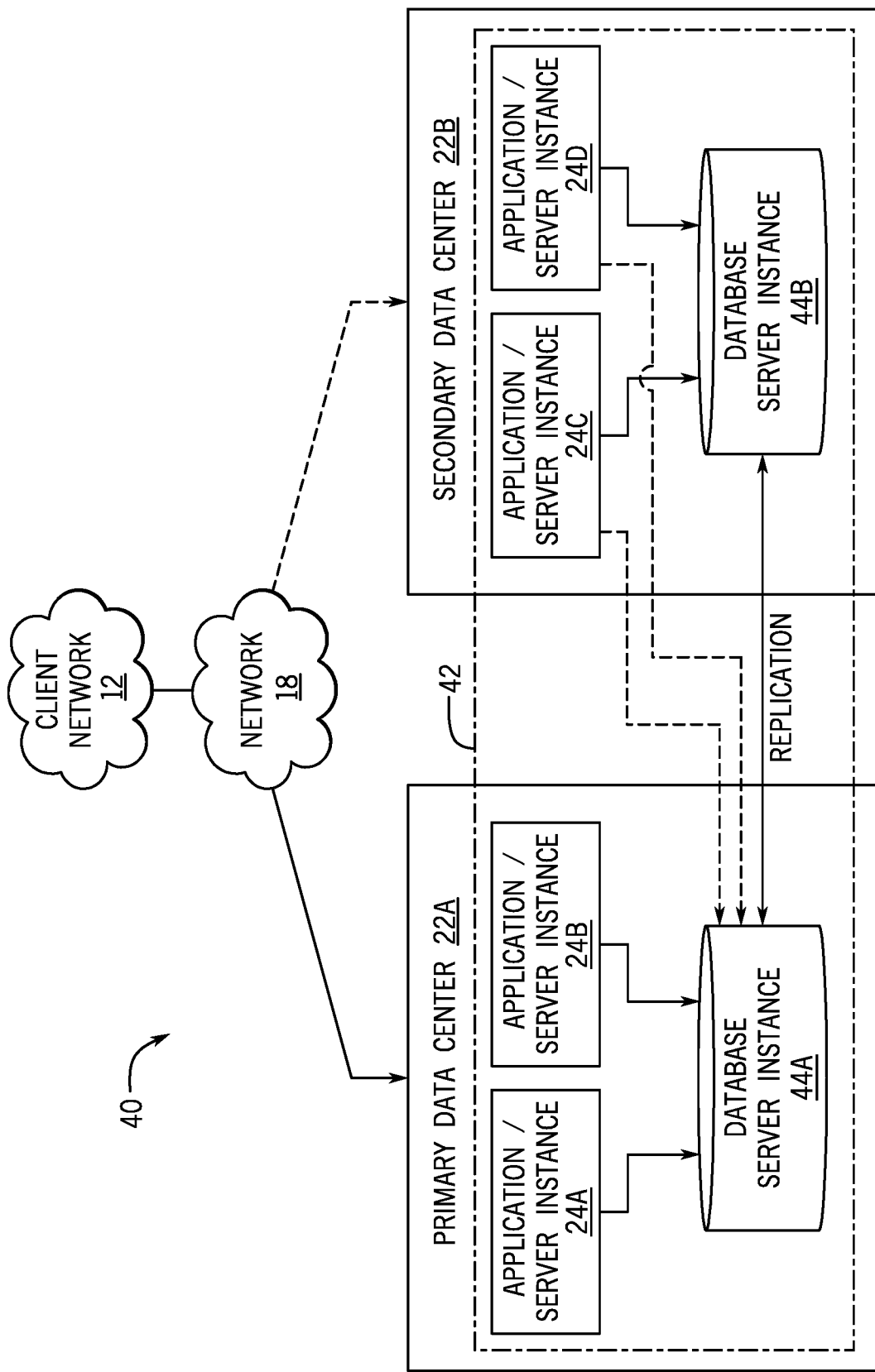
FIG. 2 is a block diagram of an embodiment of a multi-instance cloud architecture in which embodiments of the present technique may operate.

FIG. 2 is a schematic diagram of an embodiment of a multi-instance cloud architecture 40 where embodiments of the present disclosure may operate. FIG. 2 illustrates that the multi-instance cloud architecture 40 includes the client network 12 and the network 18 that connect to two (e.g., paired) data centers 22A and 22B that may be geographically separated from one another. Using FIG. 2 as an example, network environment and service provider cloud infrastructure client instance 42 (also referred to herein as a simply client instance 42) is associated with (e.g., supported and enabled by) dedicated virtual servers (e.g., virtual servers 24A, 24B, 24C, and 24D) and dedicated database servers (e.g., virtual database servers 44A and 44B). Stated another way, the virtual servers 24A-24D and virtual database servers 44A and 44B are not shared with other client instances and are specific to the respective client instance 42. Other embodiments of the multi-instance cloud architecture 40 could include other types of dedicated virtual servers, such as a web server. For example, the client instance 42 could be associated with (e.g., supported and enabled by) the dedicated virtual servers 24A-24D, dedicated virtual database servers 44A and 44B, and additional dedicated virtual web servers (not shown in FIG. 2).

In the depicted example, to facilitate availability of the client instance 42, the virtual servers 24A-24D and virtual database servers 44A and 44B are allocated to two different data centers 22A and 22B, where one of the data centers 22 acts as a backup data center. In reference to FIG. 2, data center 22A acts as a primary data center that includes a primary pair of virtual servers 24A and 24B and the primary virtual database server 44A associated with the client instance 42. Data center 22B acts as a secondary data center 22B to back up the primary data center 22A for the client instance 42. To back up the primary data center 22A for the client instance 42, the secondary data center 22B includes a secondary pair of virtual servers 24C and 24D and a secondary virtual database server 44B. The primary virtual database server 44A is able to replicate data to the secondary virtual database server 44B (e.g., via the network 18).

As shown in FIG. 2, the primary virtual database server 44A may back up data to the secondary virtual database server 44B using a database replication operation. The replication of data between data could be implemented by performing full backups weekly and daily incremental backups in both data centers 22A and 22B. Having both a primary data center 22A and secondary data center 22B allows data traffic that typically travels to the primary data center 22A for the client instance 42 to be diverted to the second data center 22B during a failure and/or maintenance scenario. Using FIG. 2 as an example, if the virtual servers 24A and 24B and/or primary virtual database server 44A fails and/or is under maintenance, data traffic for client instances 42 can be diverted to the secondary virtual servers 24C and/or 24D and the secondary virtual database server instance 44B for processing.

Although FIGS. 1 and 2 illustrate specific embodiments of a cloud computing system 10 and a multi-instance cloud architecture 40, respectively, the disclosure is not limited to the specific embodiments illustrated in FIGS. 1 and 2. For instance, although FIG. 1 illustrates that the platform 20 is implemented using data centers, other embodiments of the platform 20 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 24A-D and virtual database servers 44A and 44B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
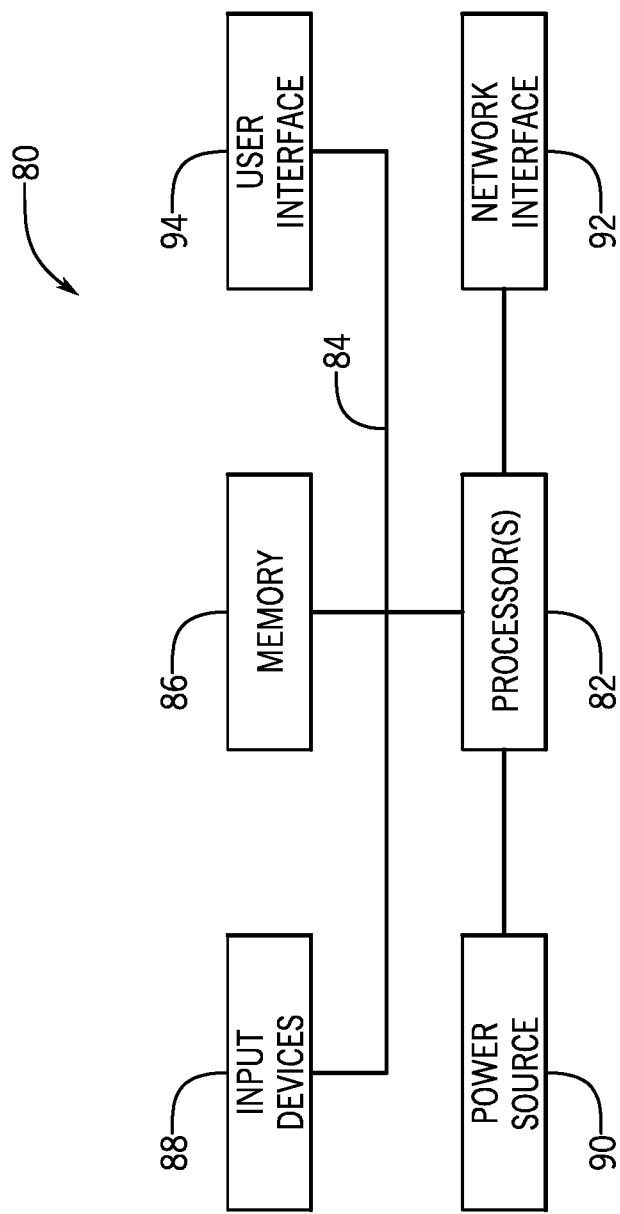
FIG. 3 is a block diagram of a computing device utilized in a computing system that may be present in FIG. 1 or 2, in accordance with aspects of the present technique.

With this in mind, and by way of background, it may be appreciated that the present approach may be implemented using one or more processor-based systems such as shown in FIG. 3. Likewise, applications and/or databases utilized in the present approach stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 80 and their potential interconnections or communication paths, such as along one or more busses. As illustrated, the computing system 80 may include various hardware components such as, but not limited to, one or more processors 82, one or more busses 84, memory 86, input devices 88, a power source 90, a network interface 92, a user interface 94, and/or other computer components useful in performing the functions described herein.

The one or more processors 82 may include one or more microprocessors capable of performing instructions stored in the memory 86. Additionally or alternatively, the one or more processors 82 may include application-specific integrated circuits (ASICs), field-programmable gate arrays (FPGAs), and/or other devices designed to perform some or all of the functions discussed herein without calling instructions from the memory 86.

With respect to other components, the one or more busses 84 include suitable electrical channels to provide data and/or power between the various components of the computing system 80. The memory 86 may include any tangible, non-transitory, and computer-readable storage media. Although shown as a single block in FIG. 1, the memory 86 can be implemented using multiple physical units of the same or different types in one or more physical locations. The input devices 88 correspond to structures to input data and/or commands to the one or more processor 82. For example, the input devices 88 may include a mouse, touchpad, touchscreen, keyboard and the like. The power source 90 can be any suitable source for power of the various components of the computing device 80, such as line power and/or a battery source. The network interface 92 includes one or more transceivers capable of communicating with other devices over one or more networks (e.g., a communication channel). The network interface 92 may provide a wired network interface or a wireless network interface. A user interface 94 may include a display that is configured to display text or images transferred to it from the one or more processors 82. In addition and/or alternative to the display, the user interface 94 may include other devices for interfacing with a user, such as lights (e.g., LEDs), speakers, and the like.

It should be appreciated that the cloud-based platform 20 discussed above provides an example an architecture that may utilize NLU technologies. In particular, the cloud-based platform 20 may include or store a large corpus of source data that can be mined, to facilitate the generation of a number of outputs, including an intent/entity model. For example, the cloud-based platform 20 may include ticketing source data having requests for changes or repairs to particular systems, dialog between the requester and a service technician or an administrator attempting to address an issue, a description of how the ticket was eventually resolved, and so forth. Then, the generated intent/entity model can serve as a basis for classifying intents in future requests, and can be used to generate and improve a conversational model to support a virtual agent that can automatically address future issues within the cloud-based platform 20 based on natural language requests from users. As such, in certain embodiments described herein, the disclosed agent automation framework is incorporated into the cloud-based platform 20, while in other embodiments, the agent automation framework may be hosted and executed (separately from the cloud-based platform 20) by a suitable system that is communicatively coupled to the cloud-based platform 20 to process utterances, as discussed below.

Figure 4A:
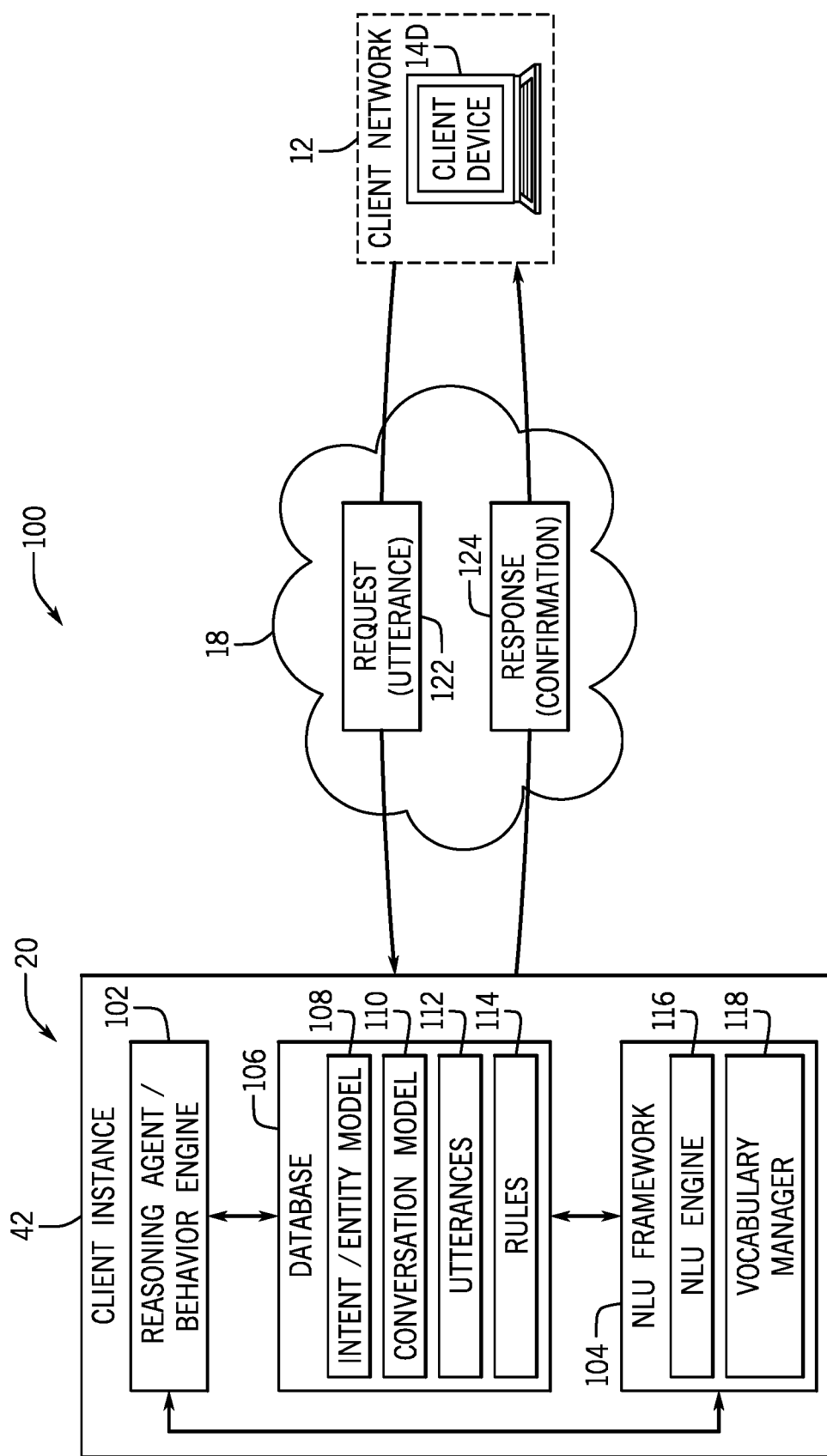
FIG. 4A is a schematic diagram illustrating an embodiment of an agent automation framework including a NLU framework that is part of a client instance hosted by the cloud computing system, in accordance with aspects of the present technique.

With the foregoing in mind, FIG. 4A illustrates an agent automation framework 100 (also referred to herein as an agent automation system 100) associated with a client instance 42, in accordance with embodiments of the present technique. More specifically, FIG. 4A illustrates an example of a portion of a service provider cloud infrastructure, including the cloud-based platform 20 discussed above. The cloud-based platform 20 is connected to a client device 14D via the network 18 to provide a user interface to network applications executing within the client instance 42 (e.g., via a web browser of the client device 14D). Client instance 42 is supported by virtual servers similar to those explained with respect to FIG. 2, and is illustrated here to show support for the disclosed functionality described herein within the client instance 42. The cloud provider infrastructure is generally configured to support a plurality of end-user devices, such as client device 14D, concurrently, wherein each end-user device is in communication with the single client instance 42. Also, the cloud provider infrastructure may be configured to support any number of client instances, such as client instance 42, concurrently, with each of the instances in communication with one or more end-user devices. As mentioned above, an end-user may also interface with client instance 42 using an application that is executed within a web browser.

The embodiment of the agent automation framework 100 illustrated in FIG. 4A includes a reasoning agent/behavior engine (RA/BE) 102, a NLU framework 104, and a database 106, which are communicatively coupled within the client instance 42. The RA/BE 102 may host or include any suitable number of virtual agents or personas that interact with the user of the client device 14D via natural language user requests 122 (also referred to herein as user utterances 122) and agent responses 124 (also referred to herein as agent utterances 124). It may be noted that, in actual implementations, the agent automation framework 100 may include a number of other suitable components, including the meaning extraction subsystem, the meaning search subsystem, and so forth, in accordance with the present disclosure.

For the embodiment illustrated in FIG. 4A, the database 106 may be a database server instance (e.g., database server instance 44A or 44B, as discussed with respect to FIG. 2), or a collection of database server instances. The illustrated database 106 stores an intent/entity model 108, a conversation model 110, a corpus of utterances 112, and a collection of rules 114 in one or more tables (e.g., relational database tables) of the database 106. The intent/entity model 108 stores associations or relationships between particular intents and particular sample utterances. In certain embodiments, the intent/entity model 108 may be authored by a designer using a suitable authoring tool. However, it should be noted that such intent/entity models typically include a limited number of sample utterances provided by the designer. Additionally, designers may have limited linguistic knowledge and, furthermore, are constrained from reasonably providing a comprehensive list of all possible ways of specifying intents in a domain. It is also presently recognized that, since the meaning associated with various intents and entities is continuously evolving within different contexts (e.g., different language evolutions per domain, per cultural setting, per client, and so forth), authored intent/entity models generally are manually updated over time. As such, it is recognized that authored intent/entity models are limited by the time and ability of the designer, and as such, these human-generated intent/entity models can be limited in both scope and functionality.

With this in mind, in certain embodiments, the intent/entity model 108 may instead be generated from the corpus of utterances 112 using techniques described in the commonly assigned, co-pending U.S. patent application Ser. No. 16/179,681, entitled, "METHOD AND SYSTEM FOR AUTOMATED INTENT MINING, CLASSIFICATION AND DISPOSITION," which is incorporated by reference herein in its entirety for all purposes. More specifically, the intent/entity model 108 may be generated based on the corpus of utterances 112 and the collection of rules 114 stored in one or more tables of the database 106. It may be appreciated that the corpus of utterances 112 may include source data collected with respect to a particular context, such as chat logs between users and a help desk technician within a particular enterprise, from a particular group of users, communications collected from a particular window of time, and so forth. As such, the corpus of utterances 112 enable the agent automation framework 100 to build an understanding of intents and entities that appropriately correspond with the terminology and diction that may be particular to certain contexts and/or technical fields, as discussed in greater detail below.

For the embodiment illustrated in FIG. 4A, the conversation model 110 stores associations between intents of the intent/entity model 108 and particular responses and/or actions, which generally define the behavior of the RA/BE 102. In certain embodiments, at least a portion of the associations within the conversation model are manually created or predefined by a designer of the RA/BE 102 based on how the designer wants the RA/BE 102 to respond to particular identified intents/entities in processed utterances. It should be noted that, in different embodiments, the database 106 may include other database tables storing other information related to intent classification, such as a tables storing information regarding compilation model template data (e.g., class compatibility rules, class-level scoring coefficients, tree-model comparison algorithms, tree substructure vectorization algorithms), meaning representations, and so forth, in accordance with the present disclosure.

For the illustrated embodiment, the NLU framework 104 includes a NLU engine 116 and a vocabulary manager 118 (also referred to herein as a vocabulary subsystem). It may be appreciated that the NLU framework 104 may include any suitable number of other components. In certain embodiments, the NLU engine 116 is designed to perform a number of functions of the NLU framework 104, including generating word vectors (e.g., intent vectors, subject or entity vectors, subtree vectors) from word or phrases of utterances, as well as determining distances (e.g., Euclidean distances) between these vectors. For example, the NLU engine 116 is generally capable of producing a respective intent vector for each intent of an analyzed utterance. As such, a similarity measure or distance between two different utterances can be calculated using the respective intent vectors produced by the NLU engine 116 for the two intents, wherein the similarity measure provides an indication of similarity in meaning between the two intents.

The vocabulary manager 118, which may be part of the vocabulary subsystem discussed below, addresses out-of-vocabulary words and symbols that were not encountered by the NLU framework 104 during vocabulary training. For example, in certain embodiments, the vocabulary manager 118 can identify and replace synonyms and domain-specific meanings of words and acronyms within utterances analyzed by the agent automation framework 100 (e.g., based on the collection of rules 114), which can improve the performance of the NLU framework 104 to properly identify intents and entities within context-specific utterances. Additionally, to accommodate the tendency of natural language to adopt new usages for pre-existing words, in certain embodiments, the vocabulary manager 118 handles repurposing of words previously associated with other intents or entities based on a change in context. For example, the vocabulary manager 118 could handle a situation in which, in the context of utterances from a particular client instance and/or conversation channel, the word "bike" actually refers to a motorcycle rather than a bicycle.

Once the intent/entity model 108 and the conversation model 110 have been created, the agent automation framework 100 is designed to receive a user utterance 122 (in the form of a natural language request) and to appropriately take action to address request. For example, for the embodiment illustrated in FIG. 4A, the RA/BE 102 is a virtual agent that receives, via the network 18, the utterance 122 (e.g., a natural language request in a chat communication) submitted by the client device 14D disposed on the client network 12. The RA/BE 102 provides the utterance 122 to the NLU framework 104, and the NLU engine 116, along with the various subsystems of the NLU framework discussed below, processes the utterance 122 based on the intent/entity model 108 to derive intents/entities within the utterance. Based on the intents/entities derived by the NLU engine 116, as well as the associations within the conversation model 110, the RA/BE 102 performs one or more particular predefined actions. For the illustrated embodiment, the RA/BE 102 also provides a response 124 (e.g., a virtual agent utterance or confirmation) to the client device 14D via the network 18, for example, indicating actions performed by the RA/BE 102 in response to the received user utterance 122. Additionally, in certain embodiments, the utterance 122 may be added to the utterances 112 stored in the database 106 for continued learning within the NLU framework 104, as discussed below.

It may be appreciated that, in other embodiments, one or more components of the agent automation framework 100 and/or the NLU framework 104 may be otherwise arranged, situated, or hosted for improved performance. For example, in certain embodiments, one or more portions of the NLU framework 104 may be hosted by an instance (e.g., a shared instance, an enterprise instance) that is separate from, and communicatively coupled to, the client instance 42. It is presently recognized that such embodiments can advantageously reduce the size of the client instance 42, improving the efficiency of the cloud-based platform 20. In particular, in certain embodiments, one or more components of the semantic mining framework 130 discussed below may be hosted by a separate instance (e.g., an enterprise instance) that is communicatively coupled to the client instance 42, as well as other client instances, to enable semantic intent mining and generation of the intent/entity model 108.

Figure 4B:
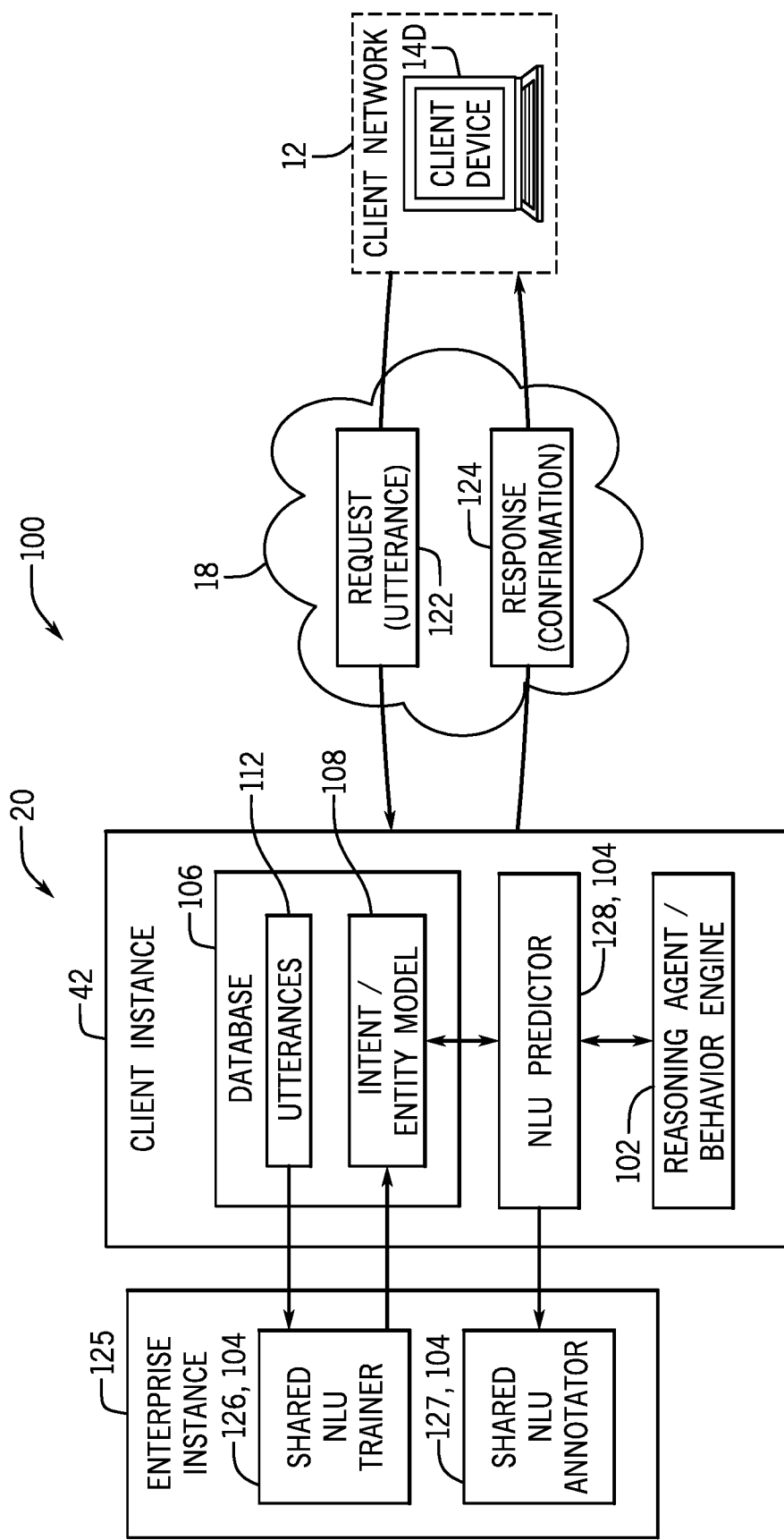
FIG. 4B is a schematic diagram illustrating an alternative embodiment of the agent automation framework in which portions of the NLU framework are part of an enterprise instance hosted by the cloud computing system, in accordance with aspects of the present technique.

With the foregoing in mind, FIG. 4B illustrates an alternative embodiment of the agent automation framework 100 in which portions of the NLU framework 104 are instead executed by a separate, shared instance (e.g., enterprise instance 125) that is hosted by the cloud computing system 20. The illustrated enterprise instance 125 is communicatively coupled to exchange data related to intent/entity mining and classification with any suitable number of client instances via a suitable protocol (e.g., via suitable Representational State Transfer (REST) requests/responses). As such, for the design illustrated in FIG. 4B, by hosting a portion of the NLU framework as a shared resource accessible to multiple client instances 42, the size of the client instance 42 can be substantially reduced (e.g., compared to the embodiment of the agent automation framework 100 illustrated in FIG. 4A) and the overall efficiency of the agent automation framework 100 can be improved.

In particular, the NLU framework 104 illustrated in FIG. 4B is divided into three distinct components that perform different aspects of semantic mining and intent classification within the NLU framework 104. These components include: a shared NLU trainer 126 hosted by the enterprise instance 125, a shared NLU annotator 127 hosted by the enterprise instance 125, and a NLU predictor 128 hosted by the client instance 42. It may be appreciated that the organizations illustrated in FIGS. 4A and 4B are merely examples, and in other embodiments, other organizations of the NLU framework 104 and/or the agent automation framework 100 may be used, in accordance with the present disclosure.

For the embodiment of the agent automation framework 100 illustrated in FIG. 4B, the shared NLU trainer 126 is designed to receive the corpus of utterances 112 from the client instance 42, and to perform semantic mining (e.g., including semantic parsing, grammar engineering, and so forth) to facilitate generation of the intent/entity model 108. Once the intent/entity model 108 has been generated, when the RA/BE 102 receives the user utterance 122 provided by the client device 14D, the NLU predictor 128 passes the utterance 122 and the intent/entity model 108 to the shared NLU annotator 127 for parsing and annotation of the utterance 122. The shared NLU annotator 127 performs semantic parsing, grammar engineering, and so forth, of the utterance 122 based on the intent/entity model 108 and returns annotated utterance trees of the utterance 122 to the NLU predictor 128 of client instance 42. The NLU predictor 128 then uses these annotated structures of the utterance 122, discussed below in greater detail, to identify matching intents from the intent/entity model 108, such that the RA/BE 102 can perform one or more actions based on the identified intents. It may be appreciated that the shared NLU annotator 127 may correspond to the meaning extraction subsystem 150, and the NLU predictor may correspond to the meaning search subsystem 152, of the NLU framework 104, as discussed below.

Figure 5:
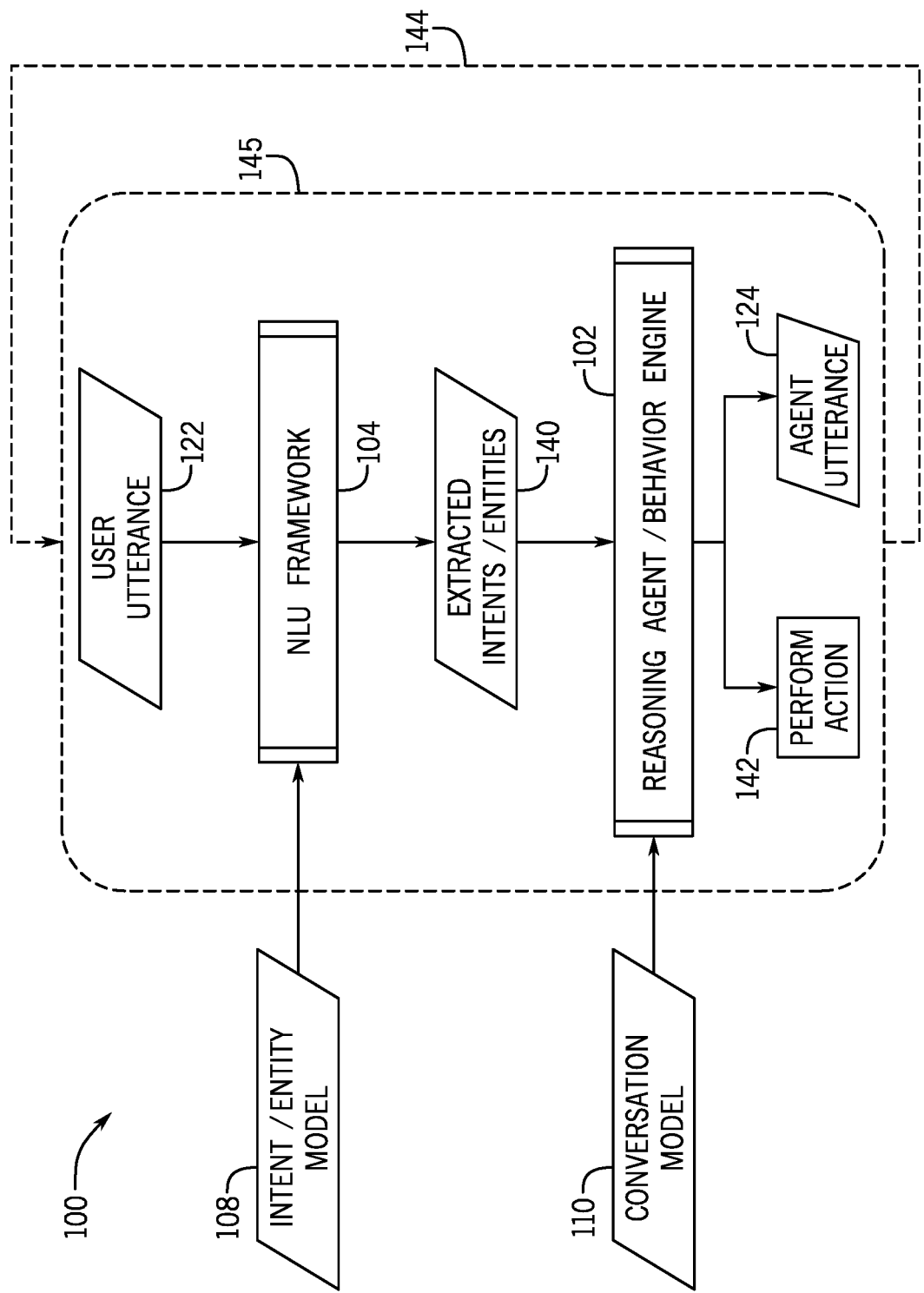
FIG. 5 is a flow diagram illustrating an embodiment of a process by which an agent automation framework, including an NLU framework and a Reasoning Agent/Behavior Engine (RA/BE) framework, extracts intent/entities from and responds to a user utterance, in accordance with aspects of the present technique.

FIG. 5 is a flow diagram depicting the roles of the reasoning agent/behavior engine (RA/BE) 102 and NLU framework 104 within an embodiment of the agent automation framework 100. For the illustrated embodiment, the NLU framework 104 processes a received user utterance 122 to extract intents/entities 140 based on the intent/entity model 108. The extracted intents/entities 140 may be implemented as a collection of symbols that represent intents and entities of the user utterance 122 in a form that is consumable by the RA/BE 102. As such, these extracted intents/ entities 140 are provided to the RA/BE 102, which processes the received intents/entities 140 based on the conversation model 110 to determine suitable actions 142 (e.g., changing a password, creating a record, purchasing an item, closing an account) and/or virtual agent utterances 124 in response to the received user utterance 122. As indicated by the arrow 144, the process 145 can continuously repeat as the agent automation framework 100 receives and addresses additional user utterances 122 from the same user and/or other users in a conversational format.

As illustrated in FIG. 5, it may be appreciated that, in certain situations, no further action or communications may occur once the suitable actions 142 have been performed. Additionally, it should be noted that, while the user utterance 122 and the agent utterance 124 are discussed herein as being conveyed using a written conversational medium or channel (e.g., chat, email, ticketing system, text messages, forum posts), in other embodiments, voice-to-text and/or text-to-voice modules or plugins could be included to translate spoken user utterance 122 into text and/or translate text-based agent utterance 124 into speech to enable a voice interactive system, in accordance with the present disclosure. Furthermore, in certain embodiments, both the user utterance 122 and the virtual agent utterance 124 may be stored in the database 106 (e.g., in the corpus of utterances 112) to enable continued learning of new structure and vocabulary within the agent automation framework 100.

Figure 6:
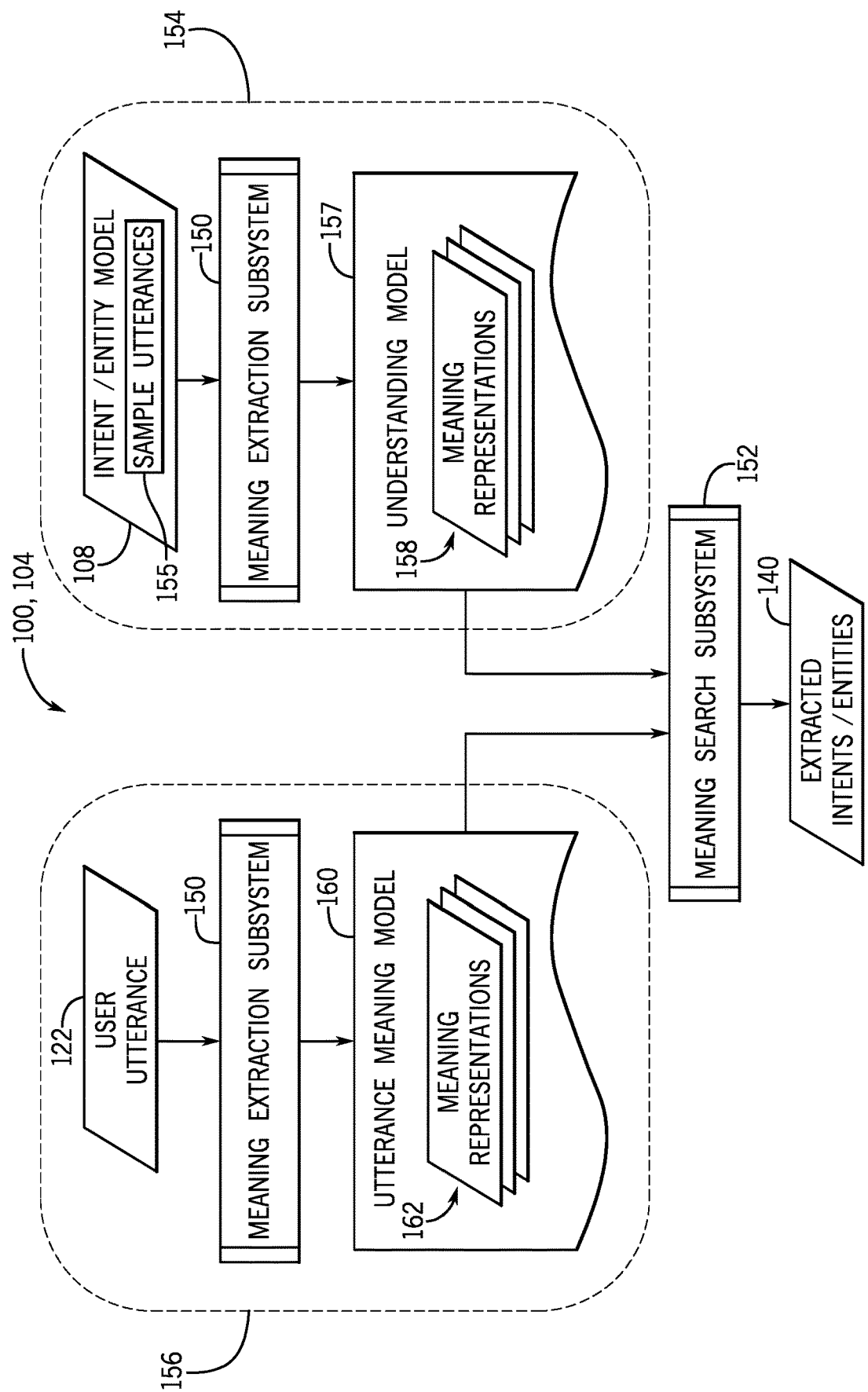
FIG. 6 is a block diagram illustrating an embodiment of the NLU framework including a meaning extraction subsystem and a meaning search subsystem, wherein the meaning extraction subsystem generates meaning representations from a received user utterance to yield an utterance meaning model and generates meaning representations from sample utterances of an intent/entity model to yield understanding model, and wherein the meaning search subsystem compares meaning representations of the utterance meaning model to meaning representations of the understanding model to extract intents and entities from the received user utterance, in accordance with aspects of the present technique.

As mentioned, the NLU framework 104 includes two primary subsystems that cooperate to convert the hard problem of NLU into a manageable search problem— namely: a meaning extraction subsystem and a meaning search subsystem. For example, FIG. 6 is a block diagram illustrating roles of the meaning extraction subsystem 150 and the meaning search subsystem 152 of the NLU framework 104 within an embodiment of the agent automation framework 100. For the illustrated embodiment, the right-hand portion 154 of FIG. 6 illustrates the meaning extraction subsystem 150 of the NLU framework 104 receiving the intent/entity model 108, which includes sample utterances 155 for each of the various intents/entities of the model. The meaning extraction subsystem 150 generates an understanding model 157 that includes meaning representations 158 of the sample utterances 155 of the intent/entity model 108. In other words, the understanding model 157 is a translated or augmented version of the intent/entity model 108 that includes meaning representations 158 to enable searching (e.g., comparison and matching) by the meaning search subsystem 152, as discussed below. As such, it may be appreciated that the right-hand portion 154 of FIG. 6 is generally performed in advance of receiving the user utterance 122, such as on a routine, scheduled basis or in response to updates to the intent/entity model 108.

For the embodiment illustrated in FIG. 6, the left-hand portion 156 illustrates the meaning extraction subsystem 150 also receiving and processing the user utterance 122 to generate an utterance meaning model 160 having at least one meaning representation 162. As discussed in greater detail below, these meaning representations 158 and 162 are data structures having a form that captures the grammatical, syntactic structure of an utterance, wherein subtrees of the data structures include subtree vectors that encode the semantic meanings of portions of the utterance. As such, for a given utterance, a corresponding meaning representation captures both syntactic and semantic meaning in a common meaning representation format that enables searching, comparison, and matching by the meaning search subsystem 152, as discussed in greater detail below. Accordingly, the meaning representations 162 of the utterance meaning model 160 can be generally thought of like a search key, while the meaning representations of the understanding model 157 define a search space in which the search key can be sought. Accordingly, the meaning search subsystem 152 searches the meaning representations 158 of the understanding model 157 to locate one or more intents/entities that match the meaning representation 162 of the utterance meaning model 160 as discussed below, thereby generating the extracted intents/entities 140.

Figure 7:
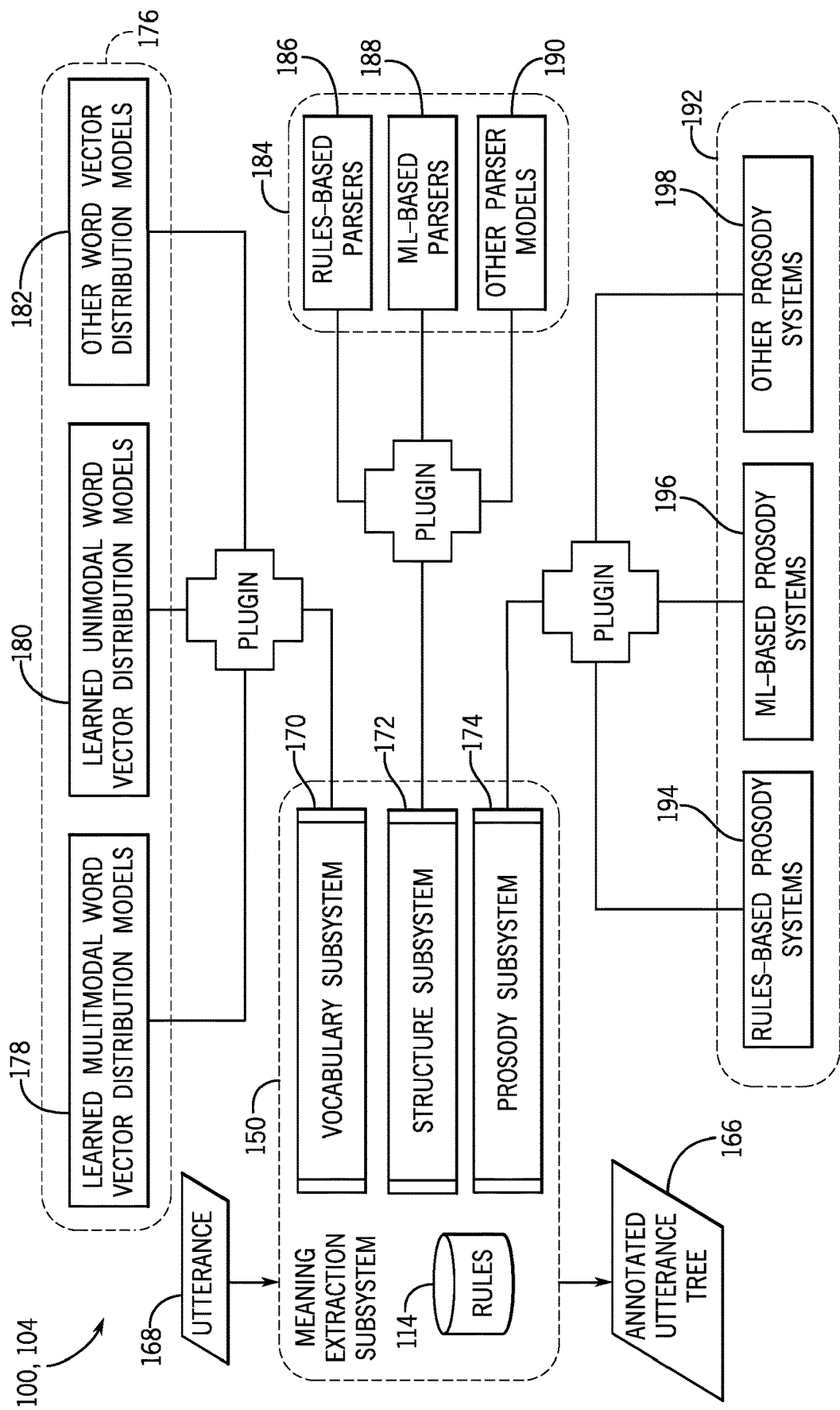
FIG. 7 is a block diagram illustrating an embodiment of the meaning extraction subsystem using a combination of rules-based methods and machine-learning (ML)-based methods within a vocabulary subsystem, a structure subsystem, and a prosody subsystem, to generate an annotated utterance tree for an utterance, in accordance with aspects of the present technique.

The meaning extraction subsystem of FIG. 6 itself includes a number of subsystems that cooperate to generate the meaning representations 158 and 162. For example, FIG. 7 is a block diagram illustrating an embodiment of the meaning extraction subsystem 150 of the NLU framework 104 of the agent automation framework 100. The illustrated embodiment of the meaning extraction subsystem 150 uses a rules-based methods interleaved with ML-based methods to generate an annotated utterance tree 166 for an utterance 168, which may be either a user utterance 122 or one of the sample utterances 155 of the intent/entity model 108, as discussed above with respect to FIG. 6. More specifically, FIG. 7 illustrates how embodiments of the meaning extraction subsystem 150 can include a number of best-of-breed models, including combinations of rule-based and ML-based (e.g., statistical) models and programs, that can be plugged into the overall NLU framework 104. For example, because of the pluggable design of the illustrated meaning extraction subsystem 150, the vocabulary subsystem 170 can include any suitable word vector distribution model that defines word vectors for various words or phrases. That is, since it is recognized that different word distribution models can excel over others in a given conversational channel, language, context, and so forth, the disclosed pluggable design enables the meaning extraction subsystem 150 to be customized to particular environments and applications. For the embodiment illustrated in FIG. 7, the meaning extraction subsystem 150 includes three plugin-supported subsystems, namely a vocabulary subsystem 170, a structure subsystem 172, and a prosody subsystem 174, and the various outputs of these subsystems are combined according to the stored rules 114 to generate the annotated utterance tree 166 from the utterance 168.

For the embodiment of the meaning extraction subsystem 150 illustrated in FIG. 7, the vocabulary subsystem 170 generally handles the vocabulary of the meaning extraction subsystem 150. As such, the illustrated meaning extraction subsystem 150 includes a number of vocabulary plug-ins 176 that enable analysis and extraction of the vocabulary of utterances. For the illustrated embodiment, the vocabulary plug-ins 176 include a learned multimodal word vector distribution model 178, a learned unimodal word vector distribution model 180, and any other suitable word vector distribution models 182. In this context, "unimodal" refers to word vector distribution models having a single respective vector for each word, while "multimodal" refers to word vector distribution models supporting multiple vectors for particular words (e.g., homonyms, polysemes) that can have different meanings in different contexts (e.g., a "bank" may refer to a place to store money, money itself, a maneuver of an aircraft, or a location near a river). The models 178, 180, and 182 provide pluggable collections of word vectors that can be selected based on suitable parameters, such as language, conversation style, conversational channel, and so forth.

For example, the learned multimodal distribution model 178 and the learned unimodal distribution model 180 can provide word distributions (e.g., defined vector spaces of word vectors) that are generated using unsupervised learning or other general clustering algorithms, as discussed below with respect to FIG. 15. That is, appreciating that words commonly used in close proximity within utterances often have related meanings, the learned multimodal distribution model 178 and learned unimodal distribution model 180 can be generated by performing statistical analysis of utterances (e.g., from the corpus of utterances 112), and then defining vectors for words based on how the word is commonly used with respect to other words within these utterances. As such, these vocabulary plugins 176 enable the vocabulary subsystem 170 to recognize and address synonyms, misspelled words, encoded symbols (e.g., web addresses, network paths, emoticons, and emojis), out-of-vocabulary terms, and so forth, when processing the user utterance 122 and sample utterances 155. In certain embodiments, the vocabulary subsystem 170 can combine or select from word vectors output by the various vocabulary plug-ins 176 based the stored rules 114 to generate word vectors for nodes of the annotated utterance tree 166, as discussed below. Moreover, the word vector distribution models 178, 180, and/or 182 can be continually updated based on unsupervised learning performed on received user utterances 122, as discussed below with respect to FIG. 15.

For the embodiment illustrated in FIG. 7, the structure subsystem 172 of the meaning extraction subsystem 150 analyzes a linguistic shape of the utterance 168 using a combination of rule-based and ML-based structure parsing plugins 184. In other words, the illustrated structure plug-ins 184 enable analysis and extraction of the syntactic and grammatical structure of the utterances 122 and 155. For the illustrated embodiment, the structure plug-ins 184 include rule-based parsers 186, ML-based parsers 188 (e.g., DNN-based parsers, RNN-based parsers, and so forth), and other suitable parser models 190. For example, one or more of these structure plug-ins 184 enables class annotations or tagging (e.g., as a verb, a subject or entity, a direct object, a modifier, and so forth) for each word or phrase of the utterance. In certain embodiments, the structure subsystem 172 can combine or select from parse structures output by the various structure plug-ins 184 based on one or more rules 114 stored in the database 106, which are used to define the structure or shape of the annotated utterance trees 166, as discussed below.

For the embodiment illustrated in FIG. 7, the prosody subsystem 174 of the meaning extraction subsystem 150 analyzes the prosody of the utterance 168 using a combination of rule-based and ML-based prosody plugins 196. The illustrated prosody plug-ins 192 include rule-based prosody systems 194, ML-based prosody systems 196, and other suitable prosody systems 198. Using these plugins, the prosody subsystem 174 analyzes the utterance 168 for prosody cues, such as rhythm (e.g., speech rhythm, segmentations indicated by punctuation or pauses), emphasis (e.g., capitalization, bolding, underlining, asterisks), focus or attention (e.g., repetition of particular terms or styles), and so forth, which can be used to determine, for example, boundaries between intents, degrees of urgency or relative importance with respect to different intents, and so forth. As such, in certain embodiments, the prosody subsystem 174 can combine or select from prosody parsed structures output by the various prosody plug-ins 192 based on the rules 114 stored in the database 106 to generate the annotated utterance tree 166, as discussed below.

As such, for the embodiment of the meaning extraction subsystem 150 illustrated in FIG. 7, the vocabulary subsystem 170, the structure subsystem 172, and the prosody subsystem 174 cooperate to generate the annotated utterance tree 166 from the utterance 168 based on one or more rules 114. It may be appreciated that, in certain embodiments, a portion of the output of one subsystem (e.g., the prosody subsystem 174) may be provided as input to another subsystem (e.g., the structure subsystem 172) when generating the annotated utterance tree 166 from the utterance 168. The resulting annotated utterance tree 166 data structure generated by the meaning extraction subsystem 150 includes a number of nodes, each associated with a respective word vector provided by the vocabulary subsystem 170. Furthermore, these nodes are arranged and coupled together to form a tree structure based on the output of the structure subsystem 172 and the prosody subsystem 174, according to the stored rules 114.

Figure 16:
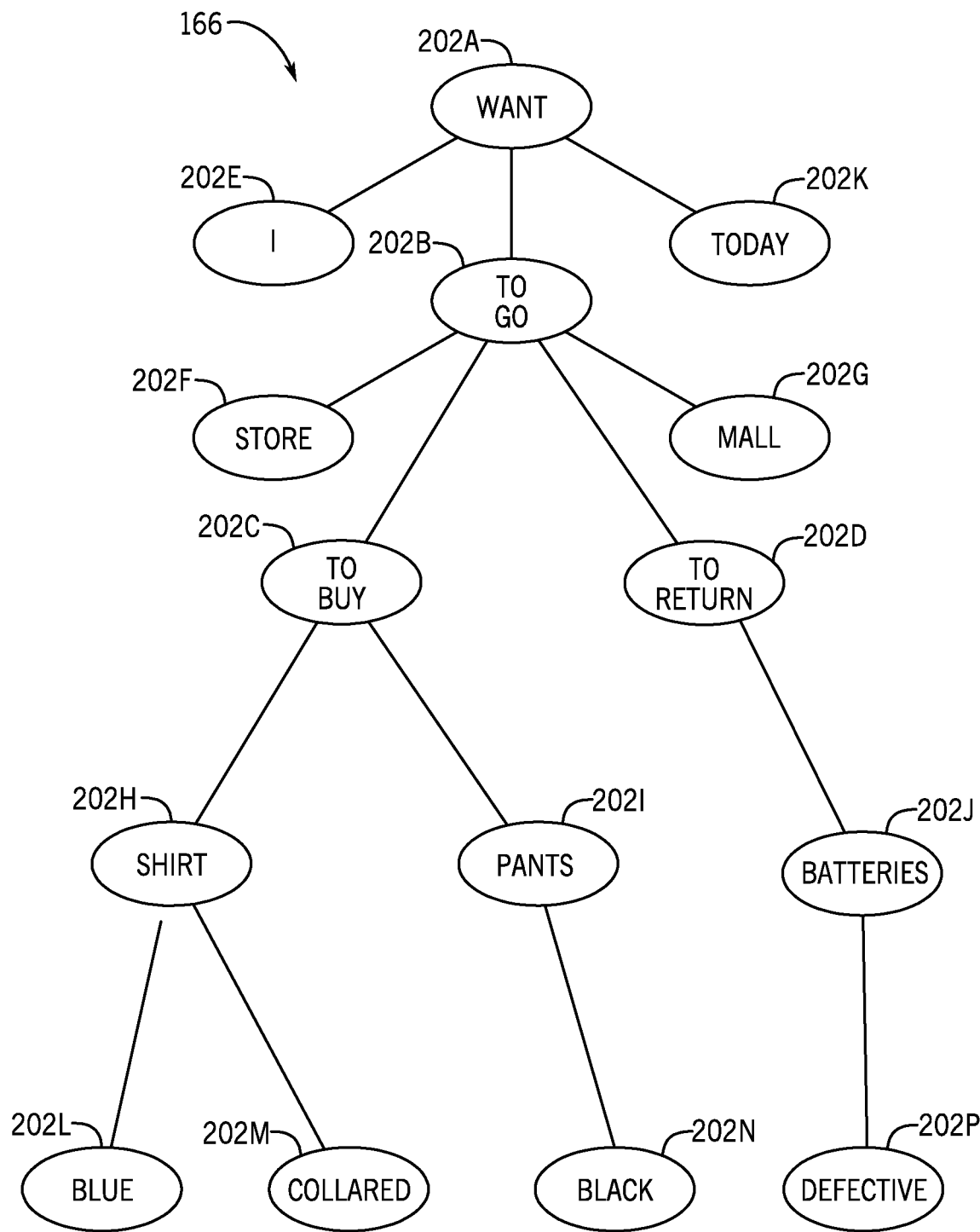
FIG. 16 is a diagram illustrating an embodiment of an annotated utterance tree, in accordance with aspects of the present technique.

For example, FIG. 16 is a diagram illustrating an example of an annotated utterance tree 166 generated for an utterance 168, in accordance with an embodiment of the present approach. As mentioned, the annotated utterance tree 166 is a data structure that is generated by the meaning extraction subsystem 150 based on the utterance 168. For the example illustrated in FIG. 16, the annotated utterance tree 166 is based on an example utterance, "I want to go to the store by the mall today to buy a blue, collared shirt and black pants and also to return some defective batteries." The illustrated annotated utterance tree 166 includes a set of nodes 202 (e.g., nodes 202A, 202B, 202C, 202D, 202E, 202F, 202G, 202H, 202I, 202J, 202K, 202L, 202M, 202N, and 202P) arranged in a tree structure, each node representing a particular word or phrase of the utterance 168. It may be noted that each of the nodes 202 may also be described as representing a particular subtree of the annotated utterance tree 166, wherein a subtree can include one or more nodes 202.

As mentioned, the form or shape of the annotated utterance tree 166 illustrated in FIG. 16 is determined by the prosody subsystem 174 and the structure subsystem 172 and represents the syntactic, grammatical meaning of the example utterance. More specifically, the prosody subsystem 174 segments the utterance, while the structure subsystem 172 constructs the annotated utterance tree 166 from these segments. Each of the nodes 202 store or reference a respective word vector that is determined by the vocabulary subsystem 170 to indicate the semantic meaning of the particular word or phase of the utterance. As mentioned, each word vector is an ordered n-dimensional list (e.g., a 300 dimensional list) of floating point values (e.g., a 1×N or an N×1 matrix) that provides a mathematical representation of the semantic meaning of a portion of an utterance.

Moreover, each of the nodes 202 is annotated by the structure subsystem 172 with additional information about the word or phrase represented by the node. For example, in FIG. 16, each of the nodes 202 has a respective shading or cross-hatching that is indicative of the class annotation of the node. In particular, for the example annotated utterance tree illustrated in FIG. 16, certain subtrees or nodes (e.g., nodes 202A, 202B, 202C, and 202D) are annotated to be verb nodes, and certain subtrees or nodes (e.g., nodes 202E, 202F, 202G, 202H, 202I, and 202J) are annotated to be subject or object nodes, and certain subtrees or nodes (e.g., nodes 202K, 202L, 202M, 202N, and 202P) are annotated to be modifier nodes (e.g., subject modifier nodes, object modifier nodes, verb modifier nodes) by the structure subsystem 172. As discussed below, these class annotations are used by the meaning search subsystem 152 when comparing meaning representations that are generated from annotated utterance trees, like the example annotated utterance tree 166 illustrated in FIG. 16. As such, it may be appreciated that the annotated utterance tree 166, from which the meaning representations are generated, serves as a basis (e.g., an initial basis) for intent/entity extraction.

Figure 8:
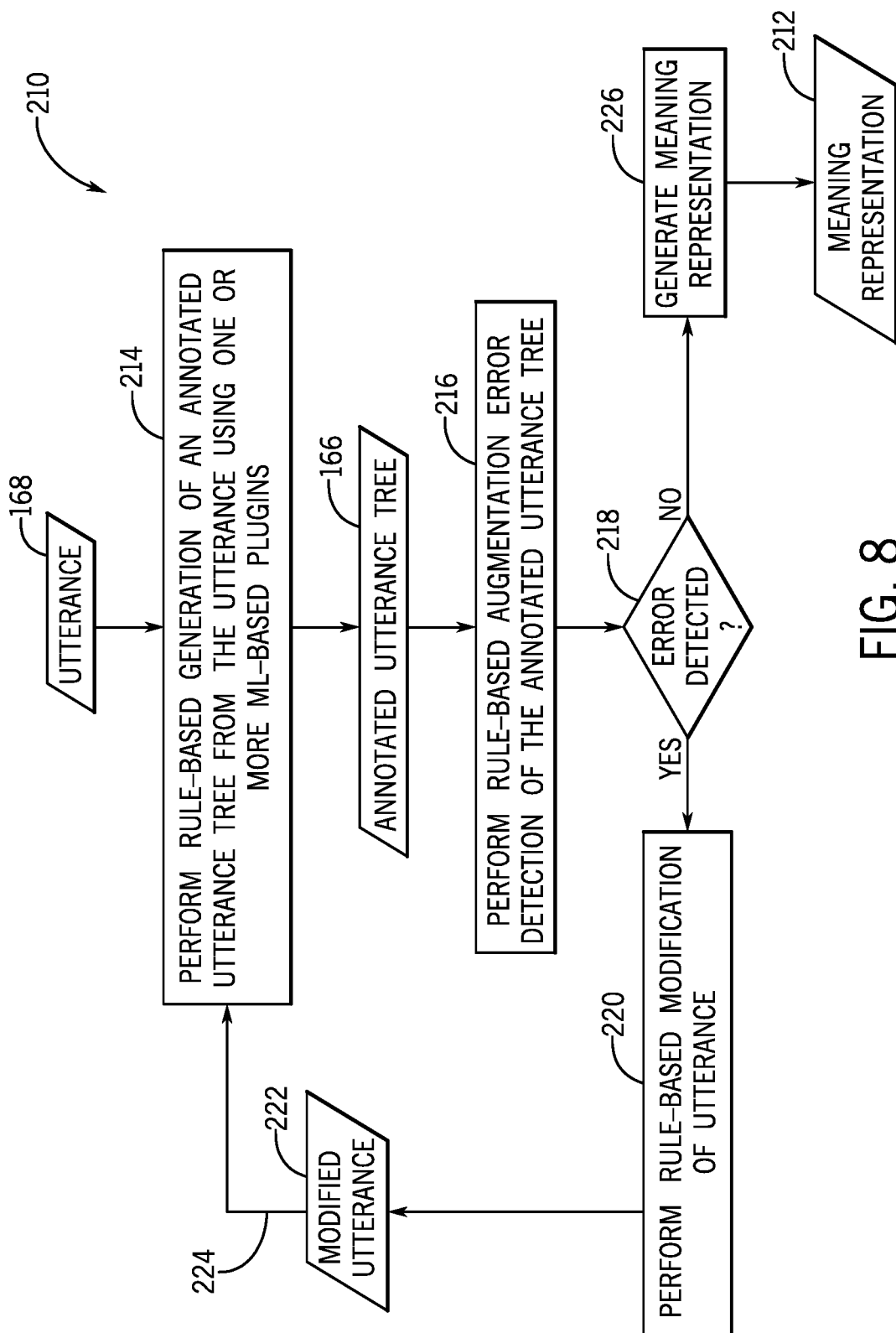
FIG. 8 is a flow diagram illustrating an example process by which the meaning extraction subsystem performs error correction of an annotated utterance tree of an utterance before generating the corresponding meaning representation of the utterance, in accordance with aspects of the present technique.

It may also be noted that, in certain embodiments, the meaning extraction subsystem 150 includes rule-based error detection and correction mechanisms for improved domain specificity. For example, FIG. 8 is a flow diagram illustrating an embodiment of a process 210 whereby the meaning extraction subsystem 150 can iteratively generate and then analyze the annotated utterance tree 166 for errors before a corresponding meaning representation 212 is generated for searching. In other words, to accommodate inaccuracies and unexpected output from ML-based models of the vocabulary subsystem 170, the structure subsystem 172, and/or the prosody subsystem 174, the meaning extraction subsystem 150 is capable of performing a rule-based automated error detection process before the corresponding meaning representation 212 is generated. It may be appreciated that, when the utterance 168 is a user utterance 122, the corresponding meaning representation 212 becomes part of the meaning representations 162 of the utterance meaning model 160, and when the utterance is one of the sample utterance 155 of the intent/entity model 108, the corresponding meaning representation 212 becomes part of the meaning representations 158 of the understanding model 157, as discussed above with respect to FIG. 6.

For the embodiment illustrated in FIG. 8, the process 210 begins with the meaning extraction subsystem 150 of the NLU framework 104 generating (block 214) the annotated utterance tree 166 from the utterance 168 using one or more ML-based plugins (e.g., ML-based parsers 188 or ML-based prosody systems 196), as discussed above. In certain embodiments, this step may include a preliminary cleansing and augmentation step performed before the annotated utterance tree 166 is generated. For example, in certain embodiments, this preliminary cleansing and augmentation step may involve the vocabulary subsystem 170, the structure subsystem 172, and/or the prosody subsystem 174 modifying the utterance 168 based on the stored rules 114. By way of specific example, during this step, the utterance 168 may be processed by the vocabulary subsystem 170 to modify words of the utterance (e.g., substitute synonyms, correct misspellings, remove punctuation, address domain-specific syntax and terminology, combine words, separate compounds words and contractions) based on the rules 114. Then, the vocabulary subsystem 170, the structure subsystem 172, and the prosody subsystem 174 of the meaning extraction subsystem 150 can cooperate to generate the annotated utterance tree 166 from the utterance 168 based on the stored rules 114.

Additionally, for the embodiment illustrated in FIG. 8, the process 210 includes a rule-based augmentation error and detection step (block 216) in which the generated annotated utterance tree 166 is analyzed for errors based on the stored rules 114. These errors may include, for example, misclassification, misparses, and so forth, by one or more ML-based plugins of the meaning extraction subsystem 150. When, during the rule-based augmentation error and detection step of block 216, the meaning extraction subsystem 150 detects an error (decision block 218), then the meaning extraction subsystem 150 performs a rule-based correction (block 220) to generate a modified utterance 222 from the original or previous utterance 168 based on the stored rules 114.

In situations in which errors are detected in block 218, once the correction has been applied in block 220, the annotated utterance tree 166 is regenerated in block 214 from the modified utterance 222 based on the rules 114, as indicated by the arrow 224. In certain embodiments, this cycle may repeat any suitable number of times, until errors are no longer detected at decision block 218. At that point, the meaning extraction subsystem 150 generates (block 226) the corresponding meaning representation 212 to be processed by the meaning search subsystem 152, as discussed below. In certain embodiments, information regarding the corrections performed in block 220 and the resulting annotated utterance tree 166 that is converted to the meaning representation 212 may be provided as input to train one or more ML-based plugins of the meaning extraction subsystem 150 e.g., ML-based parsers 188 or ML-based prosody systems 196), such that the erroneous annotated utterance trees can be avoided when processing future utterances.

Figure 9:
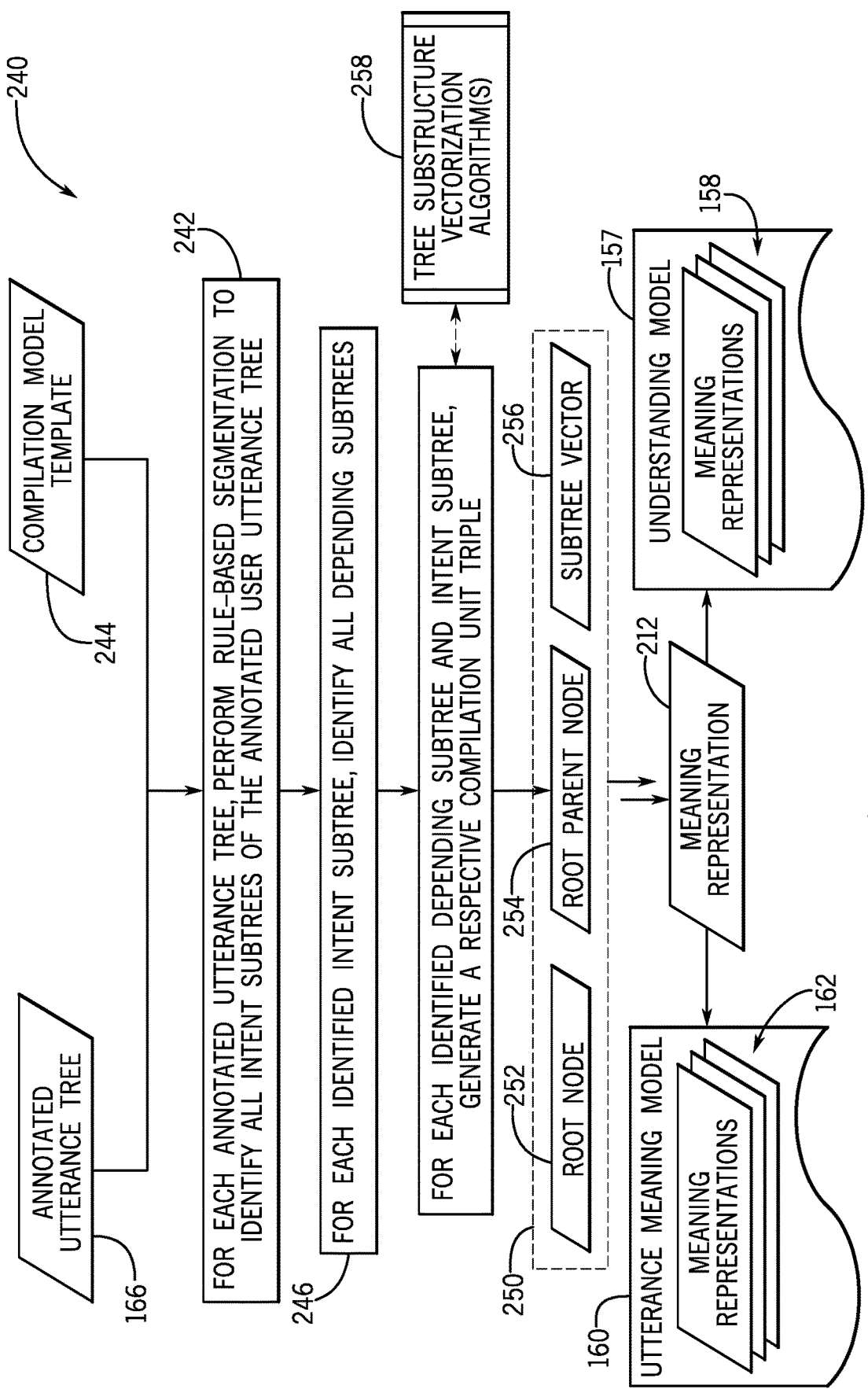
FIG. 9 is a flow diagram illustrating an example process by which the meaning extraction subsystem generates a meaning representations of the understanding model or the utterance meaning model based on the annotated utterance trees and a compilation model template, in accordance with aspects of the present technique.

In certain embodiments, generating the corresponding meaning representation 212 for the annotated utterance tree 166 (block 226) may include determining compilation unit information (e.g., root nodes, parent root nodes, and subtree vectors) and optimizing the meaning representations for search. For example, FIG. 9 is a flow diagram illustrating an embodiment of a process 240 whereby the meaning extraction subsystem 150 generates the corresponding meaning representation 212 from the annotated utterance tree 166. To do this, the prosody subsystem 174 of the meaning extraction subsystem 150 takes the annotated utterance tree 166 and performs a segmentation step (block 242) based on one or more stored rules 114 (e.g., intent segmentation rules). During this segmentation step, the annotated utterance tree 166 is segmented or divided into individual intent subtrees, each representing an atomic intent of the annotated utterance tree 166. This intent segmentation step may also involve information from a compilation model template 244, which may be part of a compilation model template table or database (e.g., associated with the database 106 of FIGS. 4A and 4B). The compilation model template 244 stores data indicating how meaning representations 162 and 158 are to be generated by the meaning extraction subsystem 150 and compared to one another by the meaning search subsystem 152, as is discussed below in greater detail.

For the embodiment illustrated in FIG. 9, for each intent subtree identified in block 242, the meaning extraction subsystem 150 identifies (block 246) all corresponding subtrees that depend from each particular intent subtree. Then, for each of these intent trees and corresponding subtrees, the meaning extraction subsystem 150 generates (block 248) a respective compilation unit triple 250. In particular, the illustrated compilation unit triple 250 includes: a reference 252 to a root node of a subtree, a reference 254 to a parent of the root node of the subtree, and a subtree vector 256 that is representative of the semantic meaning of the subtree. The aforementioned compilation model template 244 defines one or more tree substructure vectorization algorithms 258 that produce vectors for each of the corresponding subtrees, as discussed in greater detail below.

Once the compilation unit triples 250 have been generated for the annotated utterance tree 166, the annotated utterance tree 166 is converted into the meaning representation 212. In certain embodiments, certain information that is not relevant to the meaning search subsystem 152 (e.g., certain classes of nodes, certain annotation data) may be removed during this step to minimize the size of the meaning representation 212 for enhanced efficiency when searching. The generated meaning representation 212 subsequently becomes one of the meaning representations 162 of the utterance meaning model 160 or one of the meaning representations 158 of the understanding model 157, depending on the origin of the utterance 168 represented by the annotated utterance tree 166, as discussed above.

Figure 17:
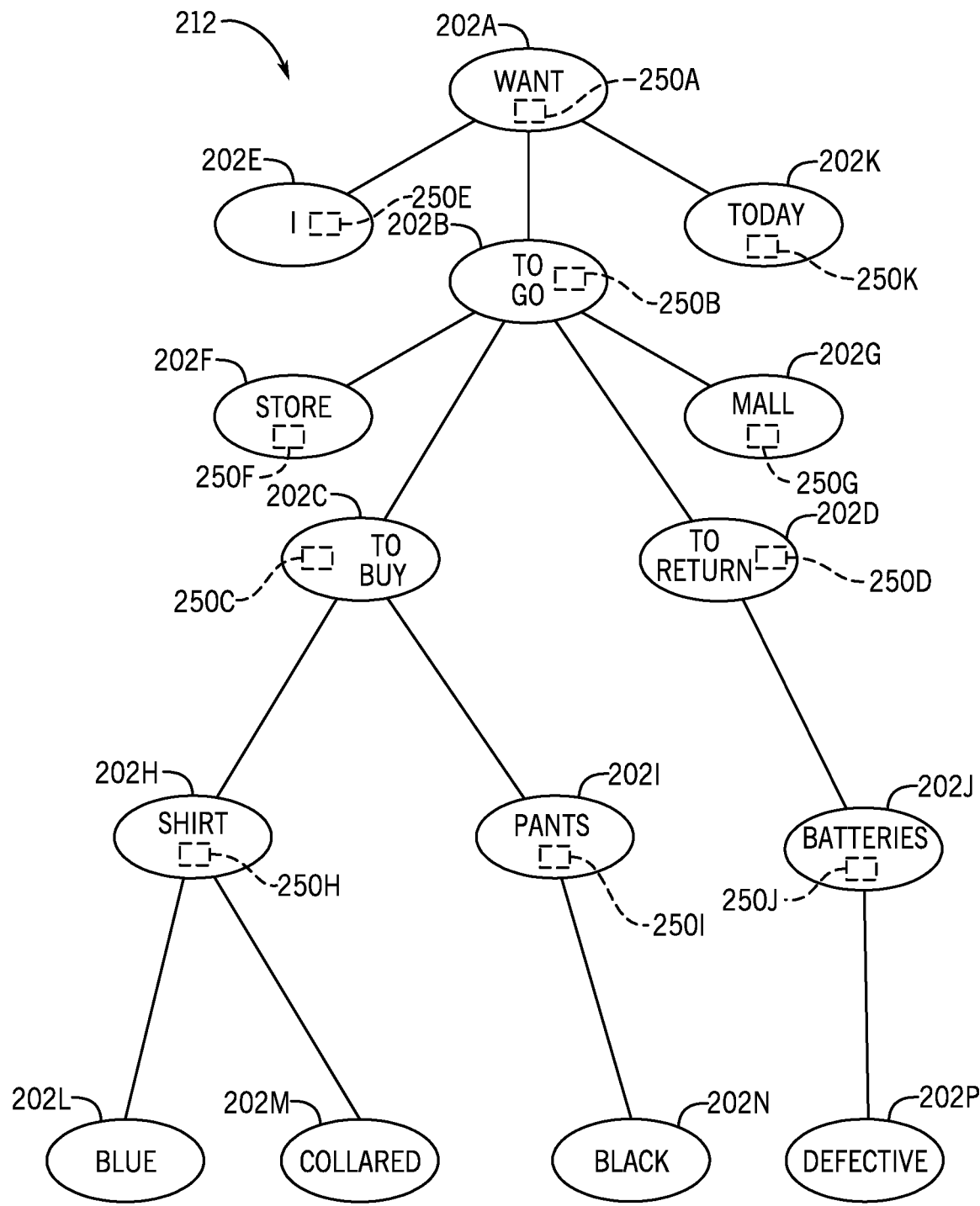
FIG. 17 is a diagram illustrating an embodiment of a meaning representation, in accordance with aspects of the present technique.

To more clearly illustrate, FIG. 17 is a diagram presenting an example of a meaning representation 212 generated for the example annotated utterance tree 166 of FIG. 16, in accordance with an embodiment of the present approach. As mentioned, the meaning representation 212 is a data structure generated from the annotated utterance tree 166 by the meaning extraction subsystem 150. As such, certain nodes of the meaning representation 212 include compilation unit triples 250 that were generated using the process 240 of FIG. 9. In particular, all of the intent subtrees (e.g., subtrees from nodes 202A, 202B, 202C, and 202D), and all of the subtrees that depend from these intent subtrees (e.g., subtrees 202E, 202F, 202G, 202H, 202I, 202J), include a respective compilation unit triple 250 (e.g., compilation unit triples 250A, 250B, 250C, 250D, 250E, 250F, 250G, 250H, 250I, and 250J). Further, as discussed above, each of these compilation unit triples 250 includes a respective subtree vector 256 that is generated based the vectors (e.g., word vectors and/or subtree vectors) of depending nodes and/or subtrees.

Figure 10:
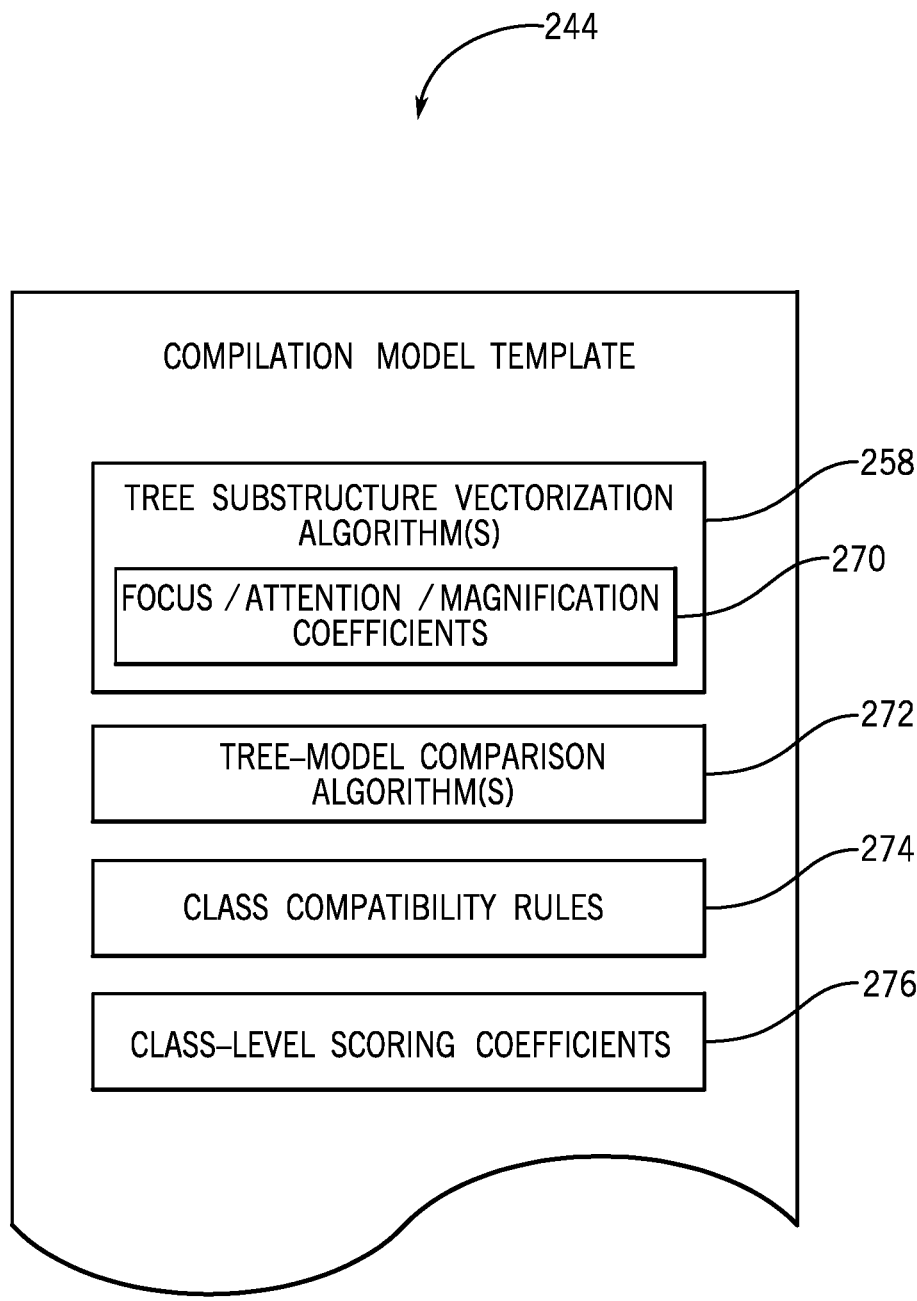
FIG. 10 is a block diagram illustrating an embodiment of the compilation model template, in accordance with aspects of the present technique.

FIG. 10 is a diagram that illustrates an example embodiment of the compilation model template 244 mentioned above. Data stored within the compilation model template 244 generally defines how the meaning extraction subsystem 150 generates subtree vectors for the annotated utterance trees 166 as part of the compilation unit triple 250 determined in block 248 of FIG. 9. Further, data stored within the compilation model template 244 generally defines how the meaning search subsystem 152 compares and scores similarity between the meaning representations 162 of the utterance meaning model 160 and the meaning representations 158 of the understanding model 157, as illustrated in FIG. 6. In certain embodiments, the compilation model template 244 may be stored as one or more tables of the database 106 illustrated in FIGS. 4A and 4B, or within another suitable data structure, in accordance with the present disclosure.

As mentioned with respect to FIG. 9, the compilation model template 244 illustrated in FIG. 10 includes one or more tables identifying or storing one or more pluggable tree substructure vectorization algorithms 258 that generate the subtree vectors 256 of the compilation unit triples 250. As illustrated, the tree substructure vectorization algorithms 258 may be associated with focus/attention/magnification (FAM) coefficients 270. For such embodiments, these FAM coefficients 270 are used to tune how much relative focus or attention (e.g., signal magnification) should be granted to each portion of a subtree when generating a subtree vector. The tree-model comparison algorithms 272, the class compatibility rules 274, and the class-level scoring coefficients 276 of the compilation model template 244 illustrated in the compilation model template 244 of FIG. 10 are discussed below.

Figure 11:
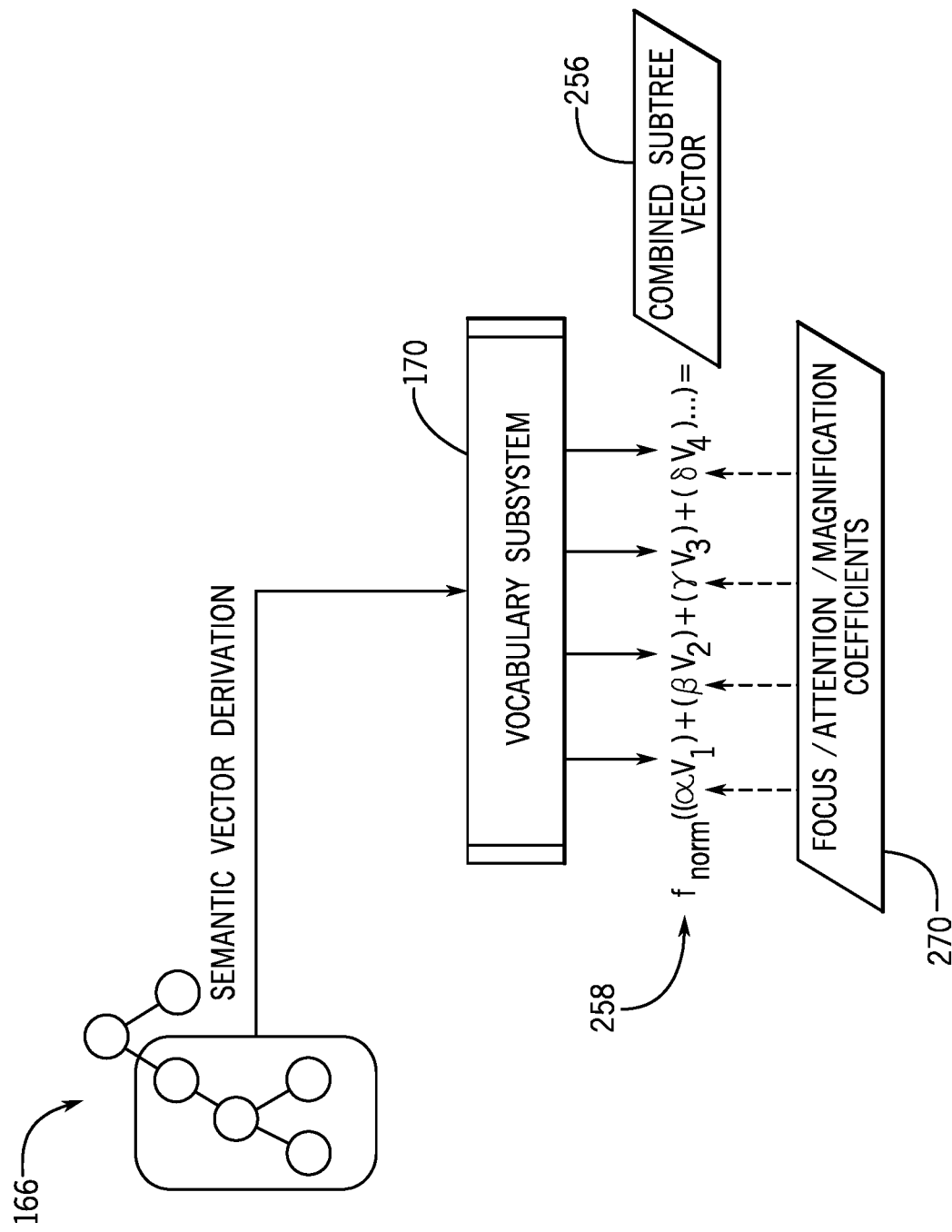
FIG. 11 is a block diagram illustrating example operation of an embodiment of a tree substructure vectorization algorithm to generate a combined subtree vector for a subtree of an annotated utterance tree, in accordance with aspects of the present technique.

FIG. 11 is a block diagram illustrating example operation of an embodiment of a tree substructure vectorization algorithm 258 to generate a subtree vector 256, which is part of the compilation unit triple 250 determined for subtrees of the annotated utterance tree 166, as discussed with respect to FIG. 9. As mentioned above, the vocabulary subsystem 170 provides word vectors for each node 202 of an annotated utterance tree 166. For the illustrated embodiment, the vocabulary subsystem 170 generated four or more word vectors, represented as $V_1$, $V_2$, $V_3$, and $V_4$, which are respectively associated with four nodes of the annotated utterance tree 166. That is, in certain embodiments, the NLU framework 104 may modify the annotated utterance tree 166 (e.g., the vocabulary subsystem 170 may replace individual words with phrasal equivalents, the structure subsystem 172 may expand contractions, and so forth), as discussed with respect to FIG. 8. As such, it is appreciated that, at one or more stages of intent/entity extraction, the number of nodes/subtrees of the annotated utterance tree 166 may be increased or decreased, along with the number of word vectors combined to calculate the subtree vector 256, relative to an original utterance or an initially generated annotated utterance tree 166.

As such, for the example illustrated in FIG. 11, the tree substructure vectorization algorithm 258 generates the subtree vector 256, by first multiplying each of the word vectors by a respective one (e.g., $\alpha$, $\beta$, $\gamma$, $\delta$) of the FAM coefficients 270, which increases or decreases the contribution of each word vector to the combined subtree vector 256. After applying the FAM coefficients 270 to the word vectors $V_{1-4}$, the results are combined using vector addition, as indicated by the "+" notation in FIG. 11. Additionally, for the illustrated embodiment, the resulting subtree vector 256 is subsequently normalized to ensure that the dimensions of the combined subtree vector are each within a suitable range after the multiplication and addition operations. It may be noted that the tree substructure vectorization algorithm 258 illustrated in FIG. 11 is merely provided as an example, and in other embodiments, other suitable tree substructure vectorization algorithms may be used, in accordance with the present disclosure.

By way of example, in certain embodiments, verb words or subtrees may be associated with one of the FAM coefficients 270 (e.g., $\alpha$) that is greater in value than another FAM coefficient (e.g., $\beta$) associated with a subject or direct object word or subtree vector. In certain embodiments, root node word vectors may be associated with a relatively higher FAM coefficient 270 than word vectors associated with other nodes. In certain embodiments, the combined subtree vector 256 is a centroid that is calculated as the weighted average of the word vectors associated with all nodes of the subtree. In other embodiments, the meaning extraction subsystem 150 may recursively perform subtree vectorization to a predefined depth or until a particular node class is identified (e.g., a subject node, a modifier node). In certain embodiments, one or more of the vectors (e.g., $V_1$, $V_2$, $V_3$, and $V_4$) that are used to generate the combined subtree vector may itself be a combined subtree vector that is generated from other underlying word and/or subtree vectors. For such embodiments, subtrees with at least one depending node (e.g., non-leaf nodes/subtrees) may be associated with a higher FAM coefficient value than single-node (e.g., a leaf nodes/subtrees).

Figure 12:
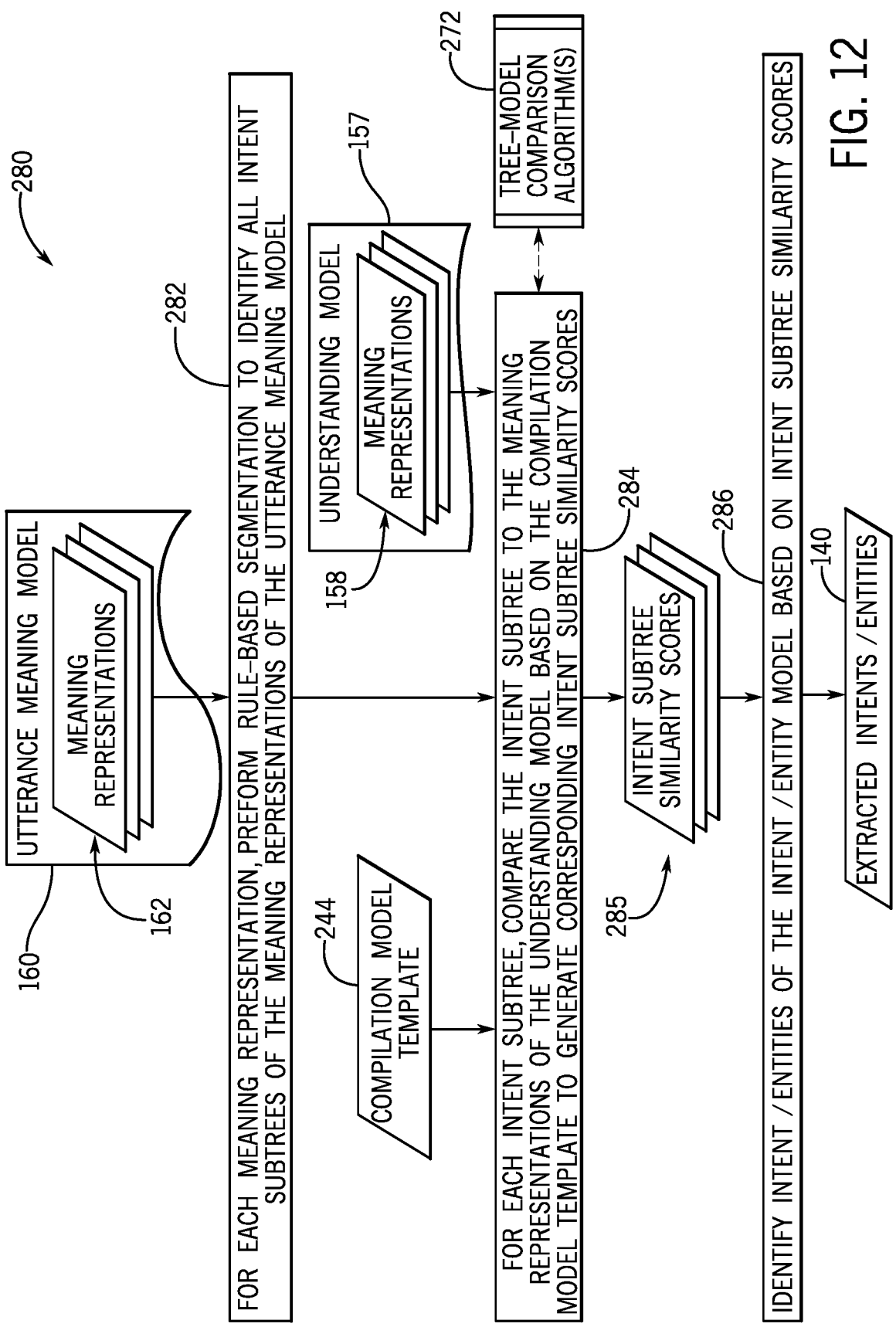
FIG. 12 is a flow diagram illustrating example process by which the meaning search subsystem searches the meaning representations of the understanding model for matches to the meaning representation of the user utterance, in accordance with aspects of the present technique.

Once the meaning representations 158 and 162 have been generated, as illustrated in FIG. 5, the meaning search subsystem 152 can compare these meaning representations to extract intent/entities from the user utterance 122. FIG. 12 is a flow diagram illustrating an example embodiment of a process 280 whereby the meaning search subsystem 152 searches the meaning representations 158 of the understanding model 157 for matches to the meaning representation 162 of the user utterance 122 based on information stored in the compilation model template 244. For the embodiment illustrated in FIG. 12, the meaning search subsystem 152 receives the at least one meaning representation 162 of the utterance meaning model 160 generated in FIG. 9, as discussed above. Using the prosody subsystem 174 discussed above, the meaning search subsystem 152 first segments (block 282) the meaning representations 162 into intent subtrees, each representing an atomic intent, based on one or more stored rules 114 (e.g., intent-segmentation rules).

For the embodiment illustrated in FIG. 12, for each intent subtree of the meaning representation 162 identified in block 282, the meaning search system 152 compares (block 284) the subtree of the meaning representation 162 to the meaning representations 158 of the understanding model 157, based on the contents of the compilation model template 244, to generate corresponding intent-subtree similarity scores 285 using the tree-model comparison algorithm 272. For the embodiment illustrated in FIG. 12, the meaning search system 152 then adds (block 286) the similarity scores calculated in block 284 to the utterance meaning model 160, which may serve as the extracted intent/entities 140 that are passed to the RA/BE 102, as illustrated in FIG. 5. In other embodiments, the meaning search system 152 may generate a different data structure (e.g., a simpler, smaller data structure) to represent the extracted intents/entities 140 that includes only the identified intents/entities from the user utterance 122 (or references to these intent/entities in the intent/entity model 108) along with the intent-subtree similarity scores 285 as a measure of confidence in the intent/entity extraction. In still other embodiments, the extracted intents/entities 140 may only include intents/entities associated with intent subtree similarity scores greater than a predetermined threshold value, which may be stored as part of the compilation model template 244.

Returning briefly to FIG. 10, the illustrated compilation model template 244 includes one or more tables identifying or storing one or more tree model comparison algorithms 272 that are used to compare and score similarity between the meaning representations 162 of the utterance meaning model 160 and the meaning representations 158 of the understanding model 157, as illustrated in FIG. 5. As discussed in greater detail, the tree model comparison algorithms 272 are pluggable modules defined or identified in the compilation model template 244 that are designed to determine a similarity score between two subtree vectors generated by the substructure vectorization algorithms 258, based on class compatibility rules 274 that are also stored as part of the compilation model template 244. The class compatibility rules 274 define which classes of subtree vectors can be compared to one another (e.g., verb word and subtree vectors are compared to one another, subject or object word and subtree vectors are compared to one another) to determine vector distances that provide measures of meaning similarity therebetween.

Figure 13:
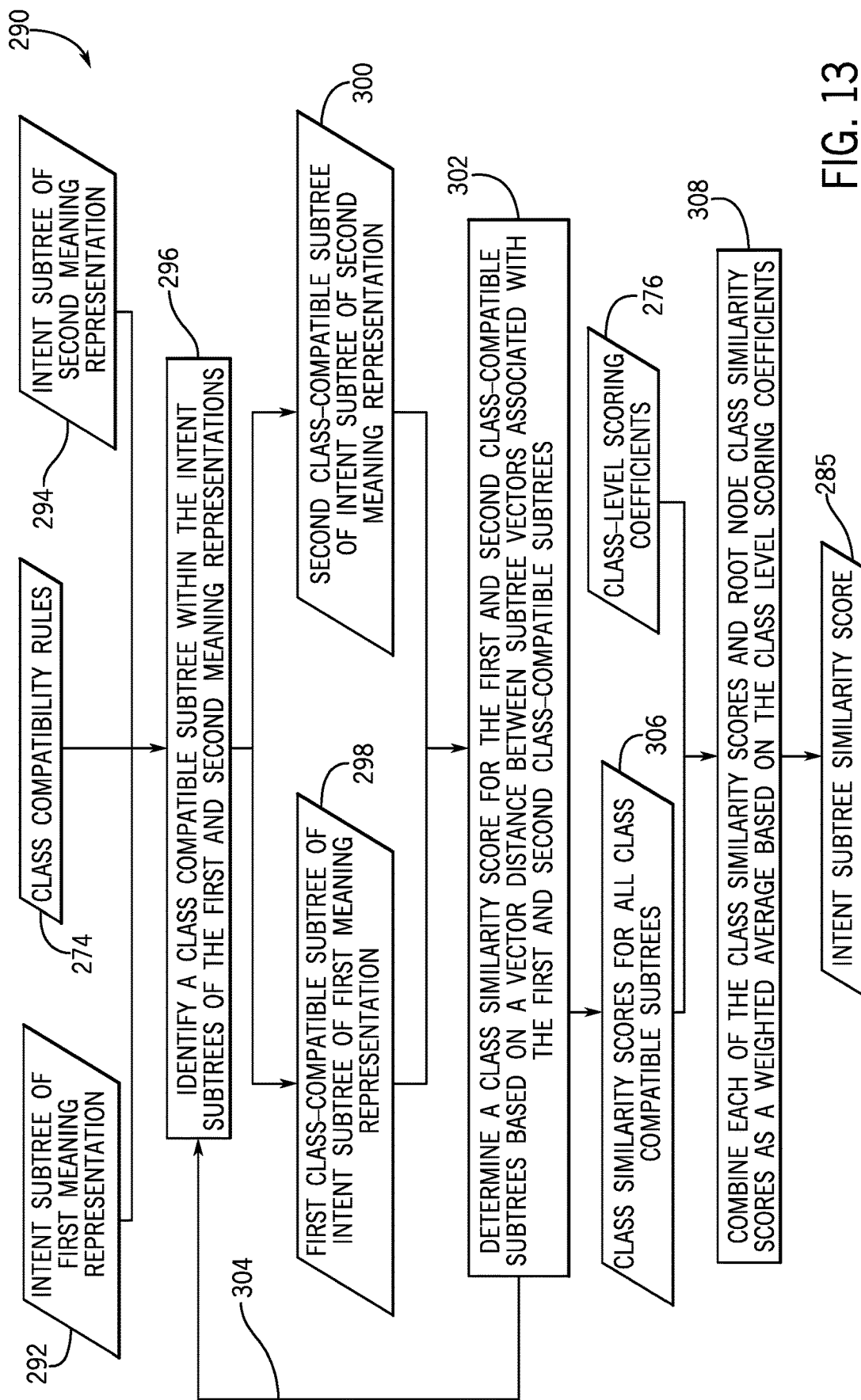
FIG. 13 is a flow diagram illustrating an embodiment of a process by which a tree-model comparison algorithm compares an intent subtree of a first meaning representation to an intent subtree of a second meaning representation, based on the compilation model template, to generate an intent subtree similarity score, in accordance with aspects of the present technique.

The illustrated embodiment of the compilation model template 244 also includes class-level scoring coefficients 276 that define different relative weights in which different classes of word/subtree vectors contribute to an overall similarity score between two subtrees, as discussed with respect to FIG. 13. For example, in certain embodiments, a verb subtree similarity score may be weighted higher and contribute more than subject subtree similarity score. This sort of weighting may be useful for embodiments in which the agent automation system 100 tends to receive specific natural language instructions. Additionally, in certain embodiments, both the action being requested and the object upon which this action should be applied may be considered more important or influential to the meaning of an utterance than the subject, especially when the subject is the agent automation system 100. For such embodiments, a verb subtree similarity score and a direct object subtree similarity score may be weighted higher and contribute more to the overall similarity score than a subject subtree similarity score. In certain embodiments, the class-level scoring coefficients 276 may be predefined, derived or updated using a ML-based approach, derived or updated using a rule-based approach, or a combination thereof.

As such, in certain embodiments, subtrees are considered a match (e.g., are afforded a higher similarity score) when they resolve to prescribed syntactic patterns found within a larger form. For instance, for an utterance determined to be in an active form (e.g., a subject-verb-any form, as detected by a rules-based parser 186 of the structure subsystem 172 using pre-defined pattern rules), a direct subject subtree (which could be a single word or a complete clause) of the verb may be treated as the subject argument to the verb-led form. Likewise, for an utterance determined to be in a passive form (e.g., a form with passive auxiliaries to the verb), then a prepositional object attached to a specific form of preposition attached to the verb may be treated as the subject equivalent. For example, certain subject (e.g., direct subject) or object (e.g., direct object, indirect object, prepositional object) subtrees are compatible with other subject or object subtrees and can be compared. As a specific example, a first utterance, "Bob ate cheese," is in the active form and, therefore, "Bob" is the direct subject of a form of the verb "to eat." In a second example utterance, "Cheese was eaten by Bob," "was" is a passive auxiliary that indicates, along with the verb form, that the second utterance is in the passive form. For the second example utterance, "by Bob" is the prepositional phrase, with "Bob" being the prepositional object. Accordingly, "Bob" in the first utterance (e.g., as a direct subject in the active form) is compatible with "Bob" in the second utterance (e.g., as a prepositional object in the passive form) and can be compared as described.

FIG. 13 illustrates an embodiment of a process 290 in which an example tree-model comparison algorithm 272 of the meaning search subsystem 152 compares an intent subtree 292 of the meaning representations 162 (representing at least a portion of the user utterance 122) to an intent subtree 294 of the meaning representations 158 (representing at least a portion of one of the sample utterances 155 of the intent/entity model 108) to calculate an intent subtree similarity score 285. As mentioned, the tree-model comparison algorithm 272 uses the class compatibility rules 274 and the class-level scoring coefficients 276 of the compilation model template 244 to calculate this intent subtree similarity score 285. It may be noted that, in other embodiments, the process 290 may include fewer steps, additional steps, repeated steps, and so forth, in accordance with the present disclosure.

For the illustrated embodiment, the process 290 involves identifying (block 296) class compatible sub-trees 298 and 300 from the intent subtrees 292 and 294, respectively, as defined by the class compatibility rules 274. For the illustrated example, the first class compatible subtree 298 (of the first intent subtree 292) and the second class compatible subtree 300 (of the second intent subtree 294) are then compared to determine a respective class similarity score. More specifically, a respective class similarity score is calculated (block 302) for each node or subtree depending from the class compatible subtrees identified in block 296. In particular, the class similarity score may be determined based on the vector distance between the subtree vectors 256 of the first and second class-compatible subtrees 298 and 300.

As indicated by the arrow 304, blocks 296 and 302 may be repeated until all class compatible subtrees have been identified and the class similarity scores 306 for all class compatible subtrees have been calculated. In an example, the class similarity score for a given class (e.g., a verb class, a subject class, a modifier class) is calculated to be the weighted average of all class-compatible similarity contributions by the constituent subtrees of the intent trees being compared. In other embodiments, the class similarity score for a given class may be calculated as an average similarity score (e.g., an average vector distance) of all nodes or subtrees of the class that are directly coupled to the root nodes of the class compatible subtrees 298 and 300. In certain embodiments, each class similarity score value between 0 and 1, inclusively. For example, when comparing the intent subtrees 292 and 294, a set (e.g., an array or matrix) of class similarity scores may include a first class similarity score corresponding to nodes and subtrees of a first class (e.g., verbs), a second class similarity score corresponding to nodes and subtrees of a second class (e.g., direct objects), a third class similarity score corresponding to nodes and subtrees of a third class (e.g., verb modifiers), and so forth.

Continuing through the process illustrated in FIG. 13, the class similarity scores 306 are subsequently combined (block 308) to yield an overall intent-subtree similarity score 285 between the first and second intent subtrees 292 and 294. That is, in block 308, the meaning search subsystem 152 uses the class-level scoring coefficients 276 of the compilation model template 244 to suitably weight each class similarity score generated in block 302 to generate the overall intent subtree similarity score 285. For example, a first class similarity score corresponding to nodes and subtrees of a first class (e.g., modifiers) is multiplied by a class-level scoring coefficient associated with the first class, a second class similarity score corresponding to nodes and subtrees of a second class (e.g., verbs) is multiplied by a class-level scoring coefficient associated with the second class, a third class similarity score corresponding to nodes and subtrees of a third class (e.g., subjects), is multiplied by a class-level scoring coefficient associated with the third class, and so forth. Additionally, in certain embodiments, one class similarity score corresponds to the vector distance between the respective subtree vectors 256 associated with the root node of the first intent subtree 292 and the root node of the second intent subtree 294, and this class similarity score is similarly multiplied by a respective class-level scoring coefficient (e.g., root node scoring coefficient). In certain embodiments, these products are summed and the result is divided by the number of class similarity scores. As such, for the illustrated example, the overall intent subtree similarity score 285 may be described as a weighted average of the class similarity scores 306 of the class compatible subtrees and the class similarity score of the root nodes. In certain embodiments, the intent subtree similarity score 285 may be normalized to have a value between 0 and 1, inclusive.

Additionally, it may be appreciated that present embodiments enable entrenchment, which is a process whereby the agent automation system 100 can continue to learn or infer meaning of new syntactic structures in new natural language utterances based on previous examples of similar syntactic structures to improve the domain specificity of the NLU framework 104 and the agent automation system 100. As used herein, "domain specificity" refers to how attuned the system is to correctly extracting intents and entities expressed actual conversations in a given domain and/or conversational channel. For example, in an embodiment, certain models (e.g., NN structure or prosody models, word vector distribution models) are initially trained or generated using generic domain data (e.g., such as a journal, news, or encyclopedic data source). Since this generic domain data may not be representative of actual conversations (e.g., actual grammatical structure, prosody, and vocabulary) of a particular domain or conversational channel, the disclosed NLU framework 104 is capable of analyzing conversations within a given domain and/or conversational channel, such that these models can be conditioned be more accurate or appropriate for the given domain.

It is presently recognized that this can enable the agent automation system 100 to have a continuously learning grammar structure model capable of accommodating changes in syntactic structure, such as new grammatical structures and changes in the use of existing grammatical structures. For example, FIG. 14 is a flow diagram illustrating an embodiment of a process 320 whereby the agent automation system 100 continuously improves a ML-based parser 188, which may be plugged into the structure subsystem 172 of the meaning extraction subsystem 150, as discussed with respect to FIG. 7.

Figure 14:
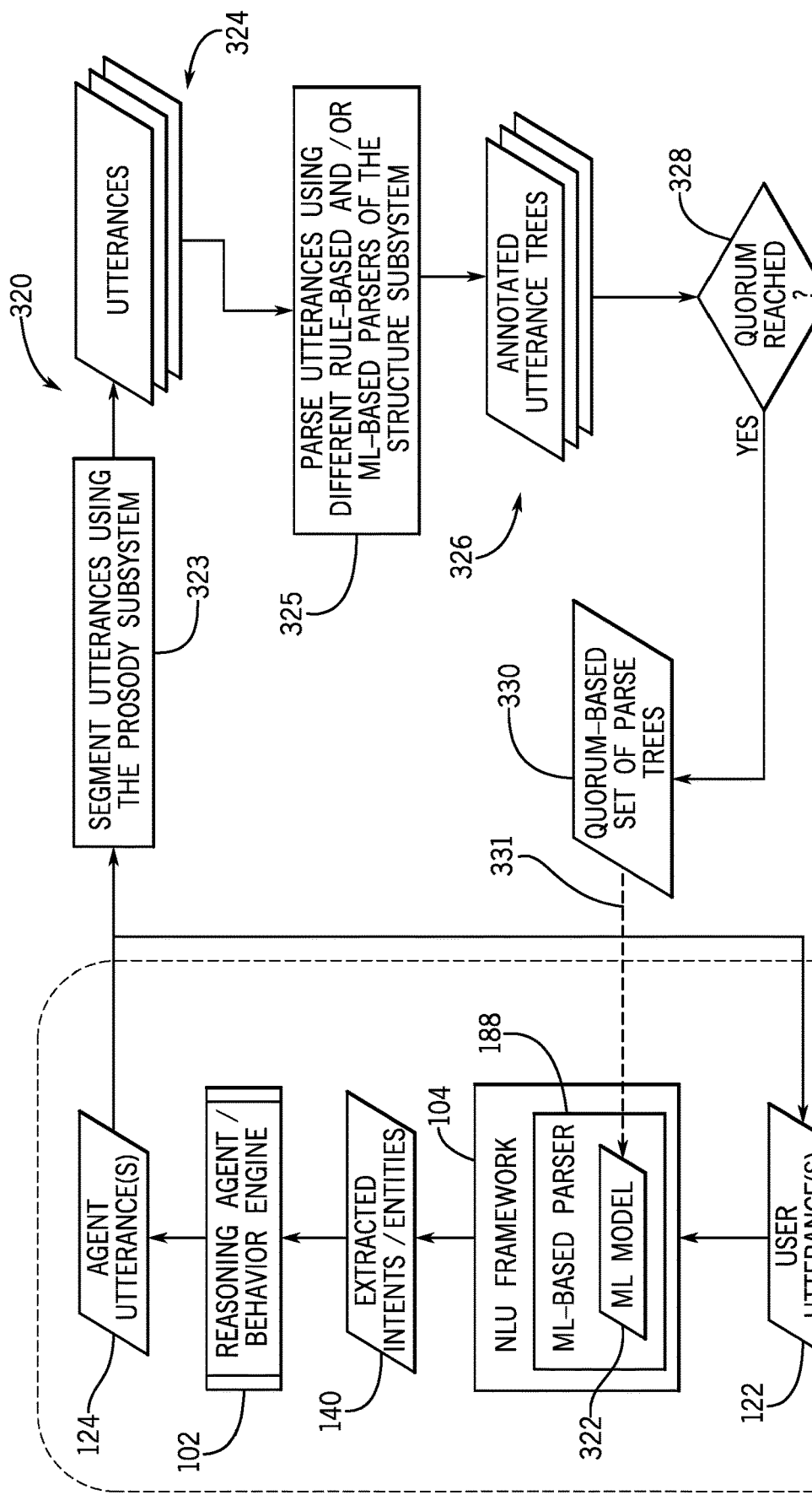
FIG. 14 is a block diagram illustrating an embodiment of a process by which the agent automation system continuously improves a structure learning model, such as a recurrent neural network associated with a ML-based parser of the NLU framework, for improved domain specificity, based on a collection of utterances, in accordance with aspects of the present technique.

For the example illustrated in FIG. 14, the ML-based parser 188 is specifically a recurrent neural network (RNN)-based parser that operates based on a RNN model 322. As such, it is appreciated that, by adjusting signal weighting within the RNN model 322, the ML-based parser 188 can continue to be trained throughout operation of the agent automation system 100 using training data generated from a continually growing corpus of utterances 112 of the database 106 illustrated in FIG. 4A. For the example illustrated in FIG. 14, the corpus of utterances 112 may be a continually growing collection of stored user utterances 122 and agent utterances 124, such as a chat log.

For the embodiment illustrated in FIG. 14, prior to operation of the agent automation system 100, the RNN-based model 322 may initially have a set of weights (e.g., a matrix of values) that are set by training. For this example, the ML-based parser 188 may be trained using a first corpus of utterances having a particular grammatical style, such as a set of books, newspapers, periodicals, and so forth, having a formal or proper grammatical structure. However, it is appreciated that many utterances exchanges in different conversational channels (e.g., chat rooms, forums, and emails) may demonstrate different grammatical structures, such as less formal or more relaxed grammatical structures. With this in mind, the continual learning loop illustrated in FIG. 14 enables the RNN-model 322 associated with the ML-based parser 188 to be continually updated and adjusted, such that the ML-based parser 188 can become more adept at parsing different (e.g., less-formal or less-proper) grammatical structures in newly received user utterances 122.

The continual leaning process 320 illustrated in FIG. 14 includes receiving and responding to the user utterance 122, as discussed above with respect to the process 145 of FIG. 5. As mentioned, in certain embodiments, the user utterances 122 and the agent utterances 124 are collected to populate the corpus of utterance 112 stored in the database 106, as illustrated in FIG. 4A. As some point, such as during regularly scheduled maintenance, the prosody subsystem 174 of the meaning extraction subsystem 150 segments (block 323) the collection of stored user utterances 122 and agent utterances 124 into distinct utterances 324 ready for parsing. Then, different rule-based parsers 186 and/or ML-based parsers 188 of the structure subsystem 172 of the meaning extraction subsystem 150 parse (block 325) each of the utterances 324 to generate a multiple annotated utterance tree structures 326 for each of the utterances 324. The meaning extraction subsystem 150 then determines (in decision block 228) whether a quorum (e.g., a simple majority consensus) has been reached by the different parsers.

For the example illustrated in FIG. 14, when the meaning extraction subsystem 150 determines in block 328 that a sufficient number (e.g., a majority, greater than a predetermined threshold value) of annotated utterance trees 326 for a particular utterance are substantially the same for a quorum to be reached, then the meaning extraction subsystem 150 may use the quorum-based set of annotated utterance trees 330 to train and improve a ML-model 322 associated with the ML-based parser 188, as indicated by the arrow 331. For example, the weights within the ML-model 322 may be repeatedly adjusted until the ML-based parser 188 generates the appropriate structure from the quorum-based set of annotated utterance trees 330 for each of the utterances 324. After this training, upon receiving a new user utterance 122 having a grammatical structure similar to a structure from the quorum-based set of annotated utterance trees 330, the operation of the ML-based parser 188, the NLU framework 104, and the agent automation system 100 is improved to more correctly parse the grammatical structure of the user utterance 122 and extract the intents/entities 140 therefrom.

Additionally, in certain embodiments, the agent automation system 100 can continue to learn or infer meaning of new words and phrases. It is presently recognized that this can enable the agent automation system 100 to have a continuously expanding/adapting vocabulary capable of accommodating the use of unfamiliar words, as well as changes to the meaning of familiar words. For example, FIG. 15 is a flow diagram illustrating an embodiment of a process 340 whereby the agent automation system 100 continuously improves a word vector distribution model 342, which may be plugged into the structure subsystem 172 of the meaning extraction subsystem 150, such as the learned multimodal word vector distribution model 178 or the learned unimodal word vector distribution model 180 discussed above with respect to FIG. 7. As such, it is appreciated that, by expanding or modifying the word vector distribution model 342, operation of the vocabulary subsystem 170, the NLU framework 104, and the agent automation system 100 can be improved to handle words with new or changing meanings using only training data that can be generated from a continually growing corpus of utterances 112 of the database 106 illustrated in FIG. 4A. For the example illustrated in FIG. 15, the corpus of utterances 112 may be, for example, a collection of chat logs storing utterances user utterances 122 and agent utterances 124 from various chat room exchanges, or other suitable source data.

Figure 15:
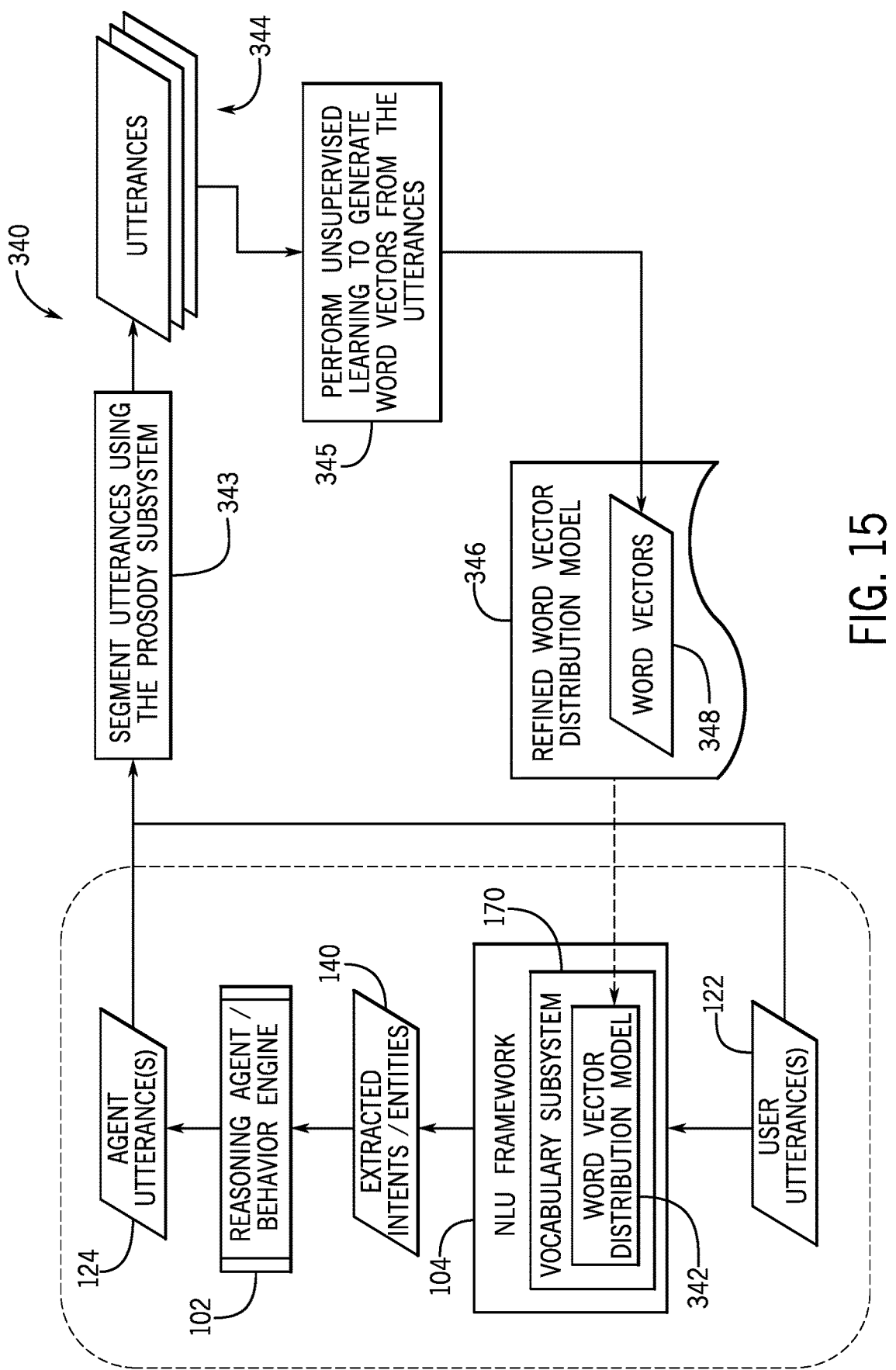
FIG. 15 is a block diagram illustrating an embodiment of a process by which the agent automation system continuously learns new words and/or refines word understanding for improved domain specificity based on a collection of utterances, in accordance with aspects of the present technique.

For the embodiment illustrated in FIG. 15, prior to operation of the agent automation system 100, the word vector distribution model 342 may initially be generated based on a first corpus of utterances that have a particular diction and vocabulary, such as a set of books, newspapers, periodicals, and so forth. However, it is appreciated that many utterances exchanges in different conversational channels (e.g., chat rooms, forums, emails) may demonstrate different diction, such as slang terms, abbreviated terms, acronyms, and so forth. With this in mind, the continual learning loop illustrated in FIG. 15 enables the word vector distribution model 342 to be modified to include new word vectors, and to change values of existing word vectors, based on source data gleaned from the growing collections of user and agent utterances 122 and 124, to become more adept at generating annotated utterance trees 166 that include these new or changing terms.

Like FIG. 14, the process 340 illustrated in FIG. 15 includes receiving and responding to the user utterance 122, as discussed above with respect to FIG. 5. As mentioned, the user utterances 122 and the agent utterances 124 can be collected to populate the corpus of utterance 112 stored in the database 106, as illustrated in FIG. 4A. As some point, such as during regularly scheduled maintenance, the prosody subsystem 174 of the meaning extraction subsystem 150 segments (block 343) the corpus of utterances 112 into distinct utterances 344 that are ready for analysis. Then, in block 345, the meaning extraction subsystem 150 performs rule-augmented unsupervised learning to generate a redefined word vector distribution model 346 containing new or different word vectors 348 generated from the segmented utterances 344.

For example, as discussed above, the meaning extraction subsystem 150 may analyze the set of segmented utterances 344 and determine word vectors 348 for the words of these utterances based on how certain words tend to be used together. For such embodiments, two words that are frequently used in similar contexts within these utterances 344 are considered closely related and, therefore, are assigned a similar vector value (e.g., relatively closer in terms of Euclidean distance) in one or more dimensions of the word vectors 348. In this manner, the meaning extraction subsystem 150 may adapt to changes in the meaning of a previously understood term based on new context in which the term is used.

As illustrated in FIG. 15, the redefined word vector distribution model 346 is used to replace the existing word vector distribution model 342, such that the vocabulary subsystem 170 can use this redefined model to provide word vectors for the words and phrases of new user utterances 122 received by the agent automation system 100. For example, an initial word vector distribution model 342 may have a word vector for the term "Everest" that is relatively close in one or more dimensions to other word vectors for terms such as, "mountain", "Himalayas", "peak", and so forth. However, when a client creates a new conference room that is named "Everest," the term begins to be used in a different context within user utterances 122. As such, in block 345, a new word vector would be generated for the term "Everest" that would be relatively close in one or more dimensions to word vectors for terms such as "conference", "meeting", "presentation", and so forth. After updating the word vector distribution model, upon receiving a user utterance 122 having the revised term "Everest," the operation of the vocabulary subsystem 170, the NLU framework 104, and the agent automation system 100 is improved to more provide more accurate word vectors, annotated utterance trees, and meaning representations, which result in more accurately extracted intents/entities 140.

Technical effects of the present disclosure include providing an agent automation framework that is capable of extracting meaning from user utterances, such as requests received by a virtual agent (e.g., a chat agent), and suitably responding to these user utterances. The NLU framework includes a meaning extraction subsystem that is designed to generate meaning representations for the sample utterances of the intent/entity model, as well as a meaning representation for a received user utterance. To generate these meaning representations, the meaning extraction subsystem includes a vocabulary subsystem, a structure subsystem, and a prosody subsystem that cooperate to parse utterances based on combinations of rule-based methods and ML-based methods. Further, for improved accuracy, the meaning extraction subsystem includes a rule-based augmentation error detection subsystem that can cooperate with the vocabulary, structure subsystem, and prosody subsystems to iteratively parse and correct an utterance before meaning representations are generated. The meaning representations are a data structure having a form or shape that captures the grammatical structure of the utterance, while subtrees of the data structure capture the semantic meaning of the words and phases of the utterance as vectors that are annotated with additional information (e.g., class information).

Additionally, the disclosed NLU framework includes a meaning search subsystem that is designed to search the meaning representations associated with the intent/entity model to locate matches for a meaning representation of a received user utterance. Conceptually, the meaning representation of the received user utterance is used like a search key to locate matching meaning representations in the search space defined by the collection of meaning representations generated from the intent/entity model. The meaning search subsystem is designed to determine a similarity score for portions of different meaning representations based on stored particular stored rules and weighting coefficients (e.g., class compatibility rules and class-level scoring coefficients). Additionally, the NLU framework can continue to learn or infer meaning of new syntactic structures in new natural language utterance based on previous examples of similar syntactic structures, and learn or modify its vocabulary based on a usage of a new term or an existing term in a new context. As such, components of the NLU framework (e.g., a neural network models, the word vector distributions) may be continuously updated based on new utterances, such as natural language exchanges between users and a virtual agent, to enhance the adaptability of the NLU framework to changes in the use and meaning of certain terms and phrases over time.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An agent automation system, comprising:
a memory configured to store a natural language understanding (NLU) framework and an intent/entity model that includes written sample utterances; and
a processor configured to execute instructions of the NLU framework to cause the agent automation system to perform actions comprising:
generating annotated utterance trees for a written user utterance and for the written sample utterances of the intent/entity model using a combination of rules-based and machine-learning (ML)-based components, wherein each annotated utterance tree includes nodes arranged in a dependency parse tree structure that represents a syntactic structure of a corresponding utterance, and wherein each of the nodes includes a word vector representing a semantic meaning of a word or phrase of the corresponding utterance;
generating a subtree vector for each subtree of the annotated utterance trees based on the word vectors of the nodes of each subtree of the annotated utterance trees; and
extracting an intent and/or entity from the written user utterance based on a comparison of the subtree vectors of the annotated utterance trees of the written user utterance to the subtree vectors of the annotated utterance trees of the written sample utterances.

2. The agent automation system of claim 1, wherein the NLU framework includes a vocabulary subsystem, a structure subsystem, and a prosody subsystem that cooperate to generate the annotated utterance tree of the corresponding utterance using the combination of rules-based and machine-learning (ML)-based components.

3. The agent automation system of claim 2, wherein the vocabulary subsystem includes a word vector distribution model, wherein word vector distribution model provides the word vectors for the nodes of the annotated utterance tree based on the word vector distribution model.

4. The agent automation system of claim 3, wherein the processor is configured to execute instructions of the NLU framework to cause the agent automation system to improve operation of the vocabulary subsystem by performing actions comprising:
performing rule-based unsupervised learning of the words and/or phrases of the written user utterance; and
modifying word vectors of the word vector distribution model based on the rule-based unsupervised learning.

5. The agent automation system of claim 2, wherein the structure subsystem includes one or more rules-based parsers and one or more ML-based parsers, wherein the structure subsystem is configured to generate and annotate the structure of the annotated utterance trees based on the syntactic structures of their corresponding utterances.

6. The agent automation system of claim 5, wherein the processor is configured to execute instructions of the NLU framework to cause the agent automation system to improve operation of the one or more ML-based parsers by performing actions comprising:
parsing the written user utterance using the one or more rules-based parsers of the structure subsystem to generate a plurality of annotated utterance trees; and
in response to the processor determining that a majority of the plurality of annotated utterance trees have a common structure, adjusting at least one weight of one or more neural network models associated with the one or more ML-based parsers such that the one or more ML-based parsers are configured to generate the common structure from the written user utterance.

7. The agent automation system of claim 2, wherein the prosody subsystem includes one or more rules-based prosody systems and one or more ML-based prosody systems, wherein the prosody system is configured to segment the written user utterance based on written prosody cues of the written user utterance, wherein the written prosody cues comprise a rhythm, an emphasis, or a focus of the written user utterance.

8. The agent automation system of claim 1, wherein, to extract the intent and/or entity from the written user utterance, the processor is configured to execute instructions of the NLU framework to cause the agent automation system to perform actions comprising:
comparing the subtree vectors of the annotated utterance trees of the written user utterance to the subtree vectors of the annotated utterance trees of the written sample utterances of the intent/entity model to identify a matching written sample utterance;
determining the intent and/or entity of the written user utterance to be a defined intent and/or entity of the intent/entity model that corresponds to the matching written sample utterance within the intent/entity model.

9. The agent automation system of claim 1, wherein the processor is configured to execute instructions of the NLU framework to cause the agent automation system perform additional actions before generating the subtree vectors, comprising:
performing rule-based error detection to detect, in a particular annotated utterance tree of the annotated utterance trees, a misclassification or misparse of words and/or phrases of the corresponding utterance of the particular annotated utterance tree;
performing a rule-based modification of the corresponding utterance of the particular annotated utterance tree to generate a modified written utterance, wherein at least a portion of words and/or phrases of the modified written utterance are different from the words and/or phrases of the corresponding utterance; and
regenerating the particular annotated utterance tree from the modified written utterance using the combination of rules-based and machine-learning (ML)-based components, wherein the regenerated particular annotated utterance tree lacks the misclassification or the misparse of the particular annotated utterance tree before regeneration.

10. The agent automation system of claim 1, wherein the intent/entity model associates defined intents with the written sample utterances, and wherein the written sample utterances encode defined entities as parameters of the defined intents within the intent/entity model.

11. A method of operating a natural language understanding (NLU) framework, comprising:
generating an annotated utterance tree for a written user utterance using a combination of rules-based and machine-learning (ML)-based components, wherein the annotated utterance tree includes nodes arranged in a dependency parse tree structure that represents a syntactic structure of the written user utterance, and wherein each of the nodes includes a word vector representing a semantic meaning of a word or phrase of the written user utterance;
performing rule-based error detection of the annotated utterance tree to detect a misclassification or misparse of words and/or phrases of the written user utterance;
performing a rule-based modification of the written user utterance to generate a modified written utterance, wherein at least a portion of words and/or phrases of the modified written utterance are different from the words and/or phrases of the written user utterance;
regenerating the annotated utterance tree from the modified written utterance using the combination of rules-based and machine-learning (ML)-based components; and
using the regenerated annotated utterance tree as a basis for intent/entity extraction of the written user utterance by:
generating a subtree vector for each subtree of the regenerated annotated utterance tree based on the word vectors of the nodes of each subtree of the regenerated annotated utterance trees; and
extracting an intent and/or entity from the written user utterance based on a comparison of the subtree vectors of the regenerated annotated utterance tree to subtree vectors of other annotated utterance trees representing sample utterances of an intent/entity model.

12. The method of claim 11, comprising performing rules-based cleansing and augmentation to modify the written user utterance before generating the annotated utterance tree.

13. The method of claim 11, wherein generating the annotated utterance tree comprises:
using a prosody subsystem of the NLU framework to analyze the written user utterance for prosody cues to segment the written user utterance;
using a structure subsystem of the NLU framework to analyze the segmented written user utterance to generate and annotate the annotated utterance tree; and
using a vocabulary subsystem of the NLU framework to analyze the written user utterance to provide word vectors for the nodes of the annotated tree based on a word vector distribution model.

14. The method of claim 13, comprising improving operation of the structure subsystem by:
parsing the written user utterance using one or more rules-based parsers of the structure subsystem to generate a plurality of utterance trees; and
in response to determining that a majority of the plurality of utterance trees have a common structure, adjusting a weight of a neural network model associated with a ML-based parser such that the ML-based parser is configured to generate the common structure from the utterance.

15. The method of claim 13, comprising improving operation of the vocabulary subsystem by:
performing rule-based unsupervised learning of words of the written user utterance; and
modifying word vectors of the word vector distribution model based on the rule-based unsupervised learning of the words of the written user utterance.

16. A non-transitory, computer-readable medium storing instructions of a natural language understanding (NLU) framework executable by one or more processors of a computing system, the instructions comprising:
instructions to use a prosody subsystem of the NLU framework to analyze a written user utterance for prosody cues to segment the written user utterance;

instructions to use a structure subsystem of the NLU framework to analyze the segmented utterance to generate an annotated utterance tree having nodes representing words and/or phrases of the written user utterance that are annotated with class information;

instructions to use a vocabulary subsystem of the NLU framework to analyze the utterance to produce word vectors for the nodes of the annotated utterance tree representing the words and/or phrases of the written user utterance; and instructions to use the annotated utterance tree as a basis for intent/entity extraction of the written user utterance comprising:

instructions to generate a subtree vector for each subtree of the annotated utterance tree based on the word vectors of the nodes of each subtree of the annotated utterance tree; and instructions to extract an intent and/or entity from the written user utterance based on a comparison of the subtree vectors of the annotated utterance trees of the written user utterance to subtree vectors of other annotated utterance trees of written sample utterances of an intent/entity model.

17. The medium of claim 16, comprising:

instructions to perform rule-based error detection of the annotated utterance tree to detect a misclassification or misparse of words and/or phrases of the written user utterance;

instructions to perform a rule-based modification of the written user utterance to generate a modified written utterance, wherein at least a portion of words and/or phrases of the modified written utterance are different from the words and/or phrases of the written user utterance; and instructions to regenerate the annotated utterance tree from the modified written utterance using the combination of rules-based and machine-learning (ML)-based components before using the annotated utterance tree as a basis for intent/entity extraction.

18. The medium of claim 16, comprising instructions to improve operation of the structure subsystem and the vocabulary subsystem, including:

instructions to parse the written user utterance using one or more rules-based parsers of the structure subsystem to generate a plurality of utterance trees, and in response a majority of the plurality of utterance trees having a common structure, instructions to adjust a weight of a neural network model associated with a ML-based parser of the structure subsystem based on the common structure; and instructions to perform rule-based unsupervised learning of the words of the written user utterance and modify word vectors of a word vector distribution model of the vocabulary subsystem based on the rule-based unsupervised learning of the words of the written user utterance.

19. The medium of claim 16, comprising:

instructions to use the prosody subsystem of the NLU framework to analyze the written sample utterances of the intent/entity model for prosody cues to segment each of the written sample utterances;

instructions to use the structure subsystem of the NLU framework to analyze the segmented written sample utterances to generate the other annotated utterance trees having nodes representing words and/or phrases of the written sample utterances, wherein the nodes are annotated with class information; and instructions to use the vocabulary subsystem of the NLU framework to analyze the written sample utterances to produce word vectors for the nodes of the other annotated utterance trees representing the words and/or phrases of the written sample utterances.

\* \* \* \* \*